(12) United States Patent
Storer et al.

(10) Patent No.: US 9,477,553 B1
(45) Date of Patent: *Oct. 25, 2016

(54) RELIABILITY BASED DATA ALLOCATION AND RECOVERY IN A STORAGE SYSTEM

(71) Applicant: NETAPP, INC., Sunnyvale, CA (US)

(72) Inventors: Mark Walter Storer, Walnut Creek, CA (US); Jiri Schindler, Jamaica Plain, MA (US)

(73) Assignee: NetApp, Inc., Sunnyvale, CA (US)

( * ) Notice: Subject to any disclaimer, the term of this patent is extended or adjusted under 35 U.S.C. 154(b) by 340 days.

This patent is subject to a terminal disclaimer.

(21) Appl. No.: 14/162,699

(22) Filed: Jan. 23, 2014

Related U.S. Application Data

(63) Continuation of application No. 13/086,267, filed on Apr. 13, 2011, now Pat. No. 8,732,518.

(51) Int. Cl.
  *G06F 11/00* (2006.01)
  *G06F 11/10* (2006.01)
(52) U.S. Cl.
  CPC ................................ *G06F 11/1092* (2013.01)
(58) Field of Classification Search
  CPC .......... G06F 11/1076; G06F 11/1008; G06F 11/1666; G06F 11/0727
  See application file for complete search history.

(56) References Cited

U.S. PATENT DOCUMENTS

| | | |
|---|---|---|
| 5,170,466 A | 12/1992 | Rogan et al. |
| 5,301,350 A | 4/1994 | Rogan et al. |
| 5,321,816 A | 6/1994 | Rogan et al. |
| 6,035,297 A | 3/2000 | Van Huben et al. |
| 6,088,693 A | 7/2000 | Van Huben et al. |
| 6,094,654 A | 7/2000 | Van Huben et al. |
| 6,138,125 A * | 10/2000 | DeMoss .............. G06F 11/1076 707/999.202 |
| 7,051,165 B2 * | 5/2006 | Kimura ................. G06F 3/0613 709/203 |

(Continued)

FOREIGN PATENT DOCUMENTS

EP 2073120 A1 6/2009

OTHER PUBLICATIONS

International Preliminary Report on Patentability for Application No. PCT/US2012/032890 mailed on Oct. 15, 2013, 6 pages.

(Continued)

*Primary Examiner* — Amine Riad
(74) *Attorney, Agent, or Firm* — Nixon Peabody LLP; Khaled Shami

(57) ABSTRACT

A storage system provides highly flexible data layouts that can be tailored based on reliability considerations. The system allocates reliability values to logical containers at an upper logical level of the system based, for example, on objectives established by reliability SLOs. Based on the reliability value, the system identifies a specific parity group from a lower physical storage level of the system for storing data corresponding to the logical container. After selecting a parity group, the system allocates the data to physical storage blocks within the parity group. In embodiments, the system attaches the reliability value information to the parity group and the physical storage units storing the data. In this manner, the underlying physical layer has a semantic understanding of reliability considerations related to the data stored at the logical level. Based on this semantic understanding, the system has the capability to prioritize data operations on the physical storage units according to the reliability values attached to the parity groups.

20 Claims, 14 Drawing Sheets

(56) References Cited

U.S. PATENT DOCUMENTS

| | | | |
|---|---|---|---|
| 7,181,437 B2 | 2/2007 | Indeck et al. | |
| 7,235,103 B2* | 6/2007 | Rivin | A61F 2/4425 623/17.13 |
| 7,325,103 B1* | 1/2008 | Zayas | G06F 3/0605 710/244 |
| 7,463,648 B1* | 12/2008 | Eppstein | G06F 9/5011 370/468 |
| 7,552,146 B1* | 6/2009 | Kahn | G06F 11/1076 |
| 7,580,956 B1* | 8/2009 | Xin | G06F 17/30067 |
| 7,644,113 B2 | 1/2010 | Midgley et al. | |
| 7,653,831 B2* | 1/2010 | Okamoto | G06F 11/1076 714/6.12 |
| 7,664,791 B1* | 2/2010 | Hamilton | G06F 17/30088 707/804 |
| 7,861,122 B2* | 12/2010 | Cornwell | G06F 11/073 711/103 |
| 7,899,795 B1* | 3/2011 | Kahn | G06F 11/0727 707/690 |
| 8,040,744 B2* | 10/2011 | Gorobets | G06F 12/0246 365/185.09 |
| 8,224,919 B2* | 7/2012 | Wilson | H04L 67/1027 709/207 |
| 8,234,650 B1* | 7/2012 | Eppstein | G06F 9/5072 709/220 |
| 8,443,153 B1* | 5/2013 | Edwards | G06F 17/30091 711/147 |
| 8,578,244 B2* | 11/2013 | Roohparvar | G06F 11/1072 365/185.09 |
| 2005/1013225 * | 7/1836 | Gold | C02F 1/00 57/58.49 |
| 2002/0156973 A1 | 10/2002 | Ulrich et al. | |
| 2003/0093528 A1* | 5/2003 | Rolia | G06F 9/5061 709/226 |
| 2004/0243699 A1* | 12/2004 | Koclanes | H04L 29/06 709/224 |
| 2005/0132257 A1 | 6/2005 | Gold et al. | |
| 2005/0210218 A1 | 9/2005 | Hoogterp | |
| 2005/0246401 A1* | 11/2005 | Edwards | G06F 17/30233 |
| 2006/0236061 A1* | 10/2006 | Koclanes | G06F 3/0605 711/170 |
| 2007/0130423 A1* | 6/2007 | Liu | G06F 3/0605 711/114 |
| 2007/0255768 A1 | 11/2007 | Shitomi et al. | |
| 2008/0120129 A1* | 5/2008 | Seubert | G06Q 10/06 705/35 |
| 2008/0184068 A1* | 7/2008 | Mogi | G06F 11/1435 714/15 |
| 2009/0157991 A1* | 6/2009 | Rajan | G06F 11/008 711/162 |
| 2009/0167959 A1 | 7/2009 | Nakamura et al. | |
| 2009/0172168 A1 | 7/2009 | Sonoda et al. | |
| 2009/0327618 A1 | 12/2009 | Pollack et al. | |
| 2010/0082900 A1 | 4/2010 | Murayama et al. | |
| 2010/0174847 A1 | 7/2010 | Paley et al. | |
| 2010/0281230 A1 | 11/2010 | Rabii et al. | |
| 2011/0010445 A1 | 1/2011 | Das et al. | |
| 2011/0010664 A1 | 1/2011 | Das et al. | |
| 2012/0005435 A1 | 1/2012 | Emaru et al. | |
| 2012/0246391 A1 | 9/2012 | Meir et al. | |
| 2013/0024736 A1 | 1/2013 | Roohparvar et al. | |
| 2013/0159785 A1 | 6/2013 | Hashimoto | |

OTHER PUBLICATIONS

Iron systems, Networks storage, Google, 2003, pp. 1-4.

Kher V., et al., "Securing Distributed Storage: Challenges, Techniques, and Systems," Computer Science and Engineering University of Minnesota, ACM 1-59593-223-X, Nov. 11, 2005, 17 pages.

Non-Final Office Action mailed Dec. 22, 2011 for U.S. Appl. No. 12/683,385, filed Jan. 6, 2010, 18 pages.

Non-Final Office Action mailed Oct. 23, 2013 for U.S. Appl. No. 13/863,316, filed Apr. 15, 2013, 36 pages.

Supplementary European Search Report for Application No. EP12771848 mailed on Jun. 30, 2015, 9 pages.

U.S. Appl. No. 13/863,315, filed Apr. 15, 2013, 31 pages.

Wu X., et al., "Reliability Modeling of Declustered-parity Raid Considering Uncorrectable Bit Errors," IEICE Transactions on Fundamentals of Electronics,Communications and Computer Sciences, Engineering Sciences Society, Tokyo, JP, Aug. 1, 1997, vol. E80-A, pp. 1508-1515, XP000751075, ISSN: 0916-8508.

"Co-Pending U.S. Appl. No. 12/683,385", filed Jan. 6, 2010, 63 pages.

"International Search Report", PCT/US2012/032890, Oct. 29, 2012, 3 pages.

"Non-Final Office Action Mailed Jul. 13, 2012", In Co-Pending U.S. Appl. No. 12/683,385 of Edwards, J.K., et al., filed Jan. 6, 2010, 36 pages.

"Notice of Allowance Mailed Jan. 14, 2013", In Co-Pending U.S. Appl. No. 12/683,385 of Edwards, J.K., et al., filed Jan. 6, 2010, 8 pages.

"Written Opinion", PCT/US2012/032890, Oct. 29, 2012, 5 pages.

* cited by examiner

RELIABILITY BASED DATA ALLOCATION AND RECOVERY IN A STORAGE SYSTEM

CROSS-REFERENCE TO RELATED APPLICATIONS

This application is a continuation of U.S. application Ser. No. 13/086,267 filed Apr. 13, 2011. The content of the above-identified application is incorporated herein by reference in its entirety.

FIELD OF THE INVENTION

At least one embodiment of the present invention pertains to data storage systems, and more particularly, to a technique for data allocation and recovery in a storage system based on reliability values associated with the data.

BACKGROUND

Network based storage (or simply, "network storage") is a common approach to backing up data, making large amounts of data accessible to multiple users, and other purposes. In a network storage environment, a storage server makes data available to client (host) systems by presenting or exporting to the clients one or more logical containers of data. There are various forms of network storage, including network attached storage (NAS) and storage area network (SAN). In a NAS context, a storage server services file-level requests from clients, whereas in a SAN context a storage server services block-level requests. Some storage servers are capable of servicing both file-level requests and block-level requests.

The technology marketplace has been experiencing several trends that impact existing network storage technologies. For example, the density of magnetic storage media continues to grow in network storage systems, but performance of such media, measured as input-output operations per second (IOPS) per spindle, has not exhibited a similar growth rate. That is, magnetic media have increased in density at a rate greater than the rate at which their speed has increased. As a result, data operations, such as backup, maintenance, recovery of failed drives, etc., take longer to complete, resulting in myriad performance and reliability issues. For example, the longer recovery time of a failed drive presents a window of vulnerability, during which the ability to protect new data is compromised. Moreover, the processing cycles spent in the longer recovery time also affects the overall performance of the storage system.

Presently, the underlying physical layer of a storage system does not have a semantic understanding of the stored data. That is, for example, the underlying physical layer does not distinguish data corresponding to important business information versus data corresponding to scratch-space information. Consequently, the physical layer does not make any effort to distinguish or otherwise prioritize the data for the various data operations. This lack of semantic understanding further exacerbates the performance and reliability issues associated with the various data operations.

SUMMARY

Introduced below is a layout and file system architecture for a storage system, and associated methods and apparatus, collectively called "the system introduced here" or simply "the system" in the discussion which follows. The system provides highly flexible data layouts that can be tailored to numerous different applications and use cases. Among other features, the system is capable of allocating physical storage units for data corresponding to logical storage entities based on, for example, reliability service level objectives (SLOs), as discussed below.

The system, in at least one embodiment, assigns a reliability value to each logical container of data (e.g., a volume) located at an upper logical layer of the storage system. In one embodiment, the reliability value is assigned according to objectives dictated by reliability SLOs. In other embodiments, the reliability value may be assigned by the user via a management interface of the storage system, or may automatically be assigned based on the type of data stored in the logical container.

Based on the reliability value, the system identifies a particular parity group from the underlying physical storage layer (e.g., a RAID layer) of the storage system for storing data corresponding to the logical container. A parity group is a collection of storage areas from one or more physical storage devices sharing one or more common protection level attributes (e.g., parity protection level, type of storage medium, etc.). In an illustrative embodiment, each "parity group" is used to denote storage areas or storage slices, selected from one or more physical storage devices (e.g., a collection of slices from different disk drives), that use a common parity-based protection scheme against data loss. The parity group for a given logical container of data is chosen based on the reliability value as dictated, for example, by the reliability SLOs. For example, a logical container with a high reliability requirement is assigned a parity group with the highest protection level. The system then allocates data for the logical container within physical storage blocks selected from the assigned parity group. In embodiments, the system attaches the reliability information of the logical container to the parity group and also to the physical storage devices in which the data is stored. For example, the reliability level information is attached as metadata to the parity group.

In this manner, the underlying physical storage layer has semantic understanding of the importance of the data stored in the physical storage devices. That is, the underlying physical layer has the capability to distinguish and prioritize data stored in the physical storage devices. Consequently, the underlying physical storage layer can prioritize various data operations (e.g., backup operations, data recovery operations) based on the values of the attached reliability information. An illustrative example is the recovery of a failed physical data element (e.g., a failed disk drive). The physical data element may comprise storage blocks or slices belonging to different parity groups. Accordingly, prior to recovery of a failed physical data element (e.g., a disk drive), the system identifies the parity groups that the failed element participated in. The system then prioritizes the list of parity groups, and performs the recovery process first on the physical storage device belonging to the parity groups with the highest reliability values (as indicated, for example, by reliability SLOs).

In this manner, the system has the ability to, for example, efficiently postpone or otherwise de-prioritize data recovery operations on physical storage devices with lower reliability values. Prioritizing the data recovery operations on the parity groups with high reliability values results in significant performance and reliability improvement. For example, in the reconstruction or failure recovery scenario, the reliability-based prioritization minimizes the window of vulnerability to data-loss due to failure of another physical storage element, and also lowers the interference with system's foreground/primary workload.

Other aspects of the technique will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

I. Overview

A storage system provides highly flexible data layouts that can be tailored based on reliability considerations. The system allocates reliability values to logical containers at an upper logical level of the system based, for example, on objectives established by reliability SLOs. Based on the reliability value, the system identifies a specific parity group from a lower physical storage level of the system for storing data corresponding to the logical container. After selecting a parity group, the system allocates the data to physical storage blocks within the parity group. In embodiments, the system attaches the reliability value information to the parity group and the physical storage units storing the data. In this manner, the underlying physical layer has a semantic understanding of reliability considerations related to the data stored at the logical level. Based on this semantic understanding, the system has the capability to prioritize data operations (e.g., recovery operations, maintenance operations, etc.) on the physical storage units according to the reliability values attached to the parity groups.

II. System Environment

Figure 1:
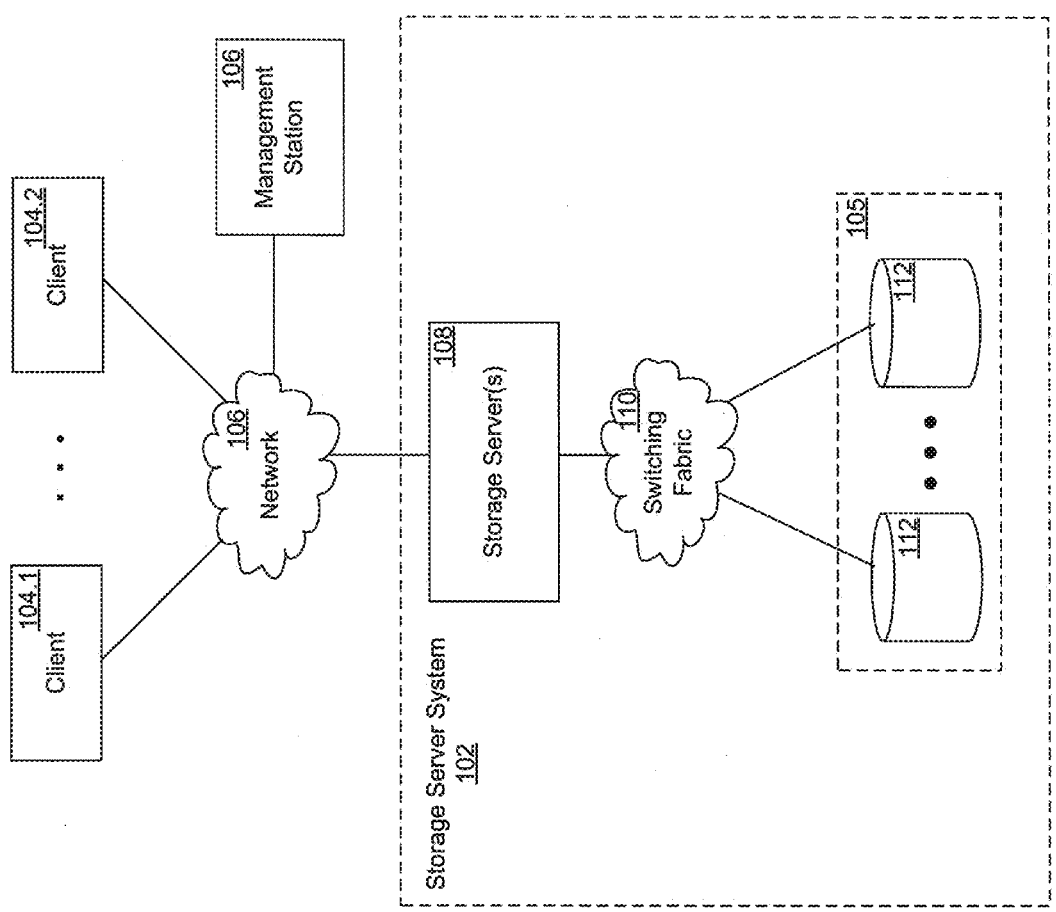
FIG. 1 illustrates a network storage environment in which the present invention can be implemented.
Figure 2:
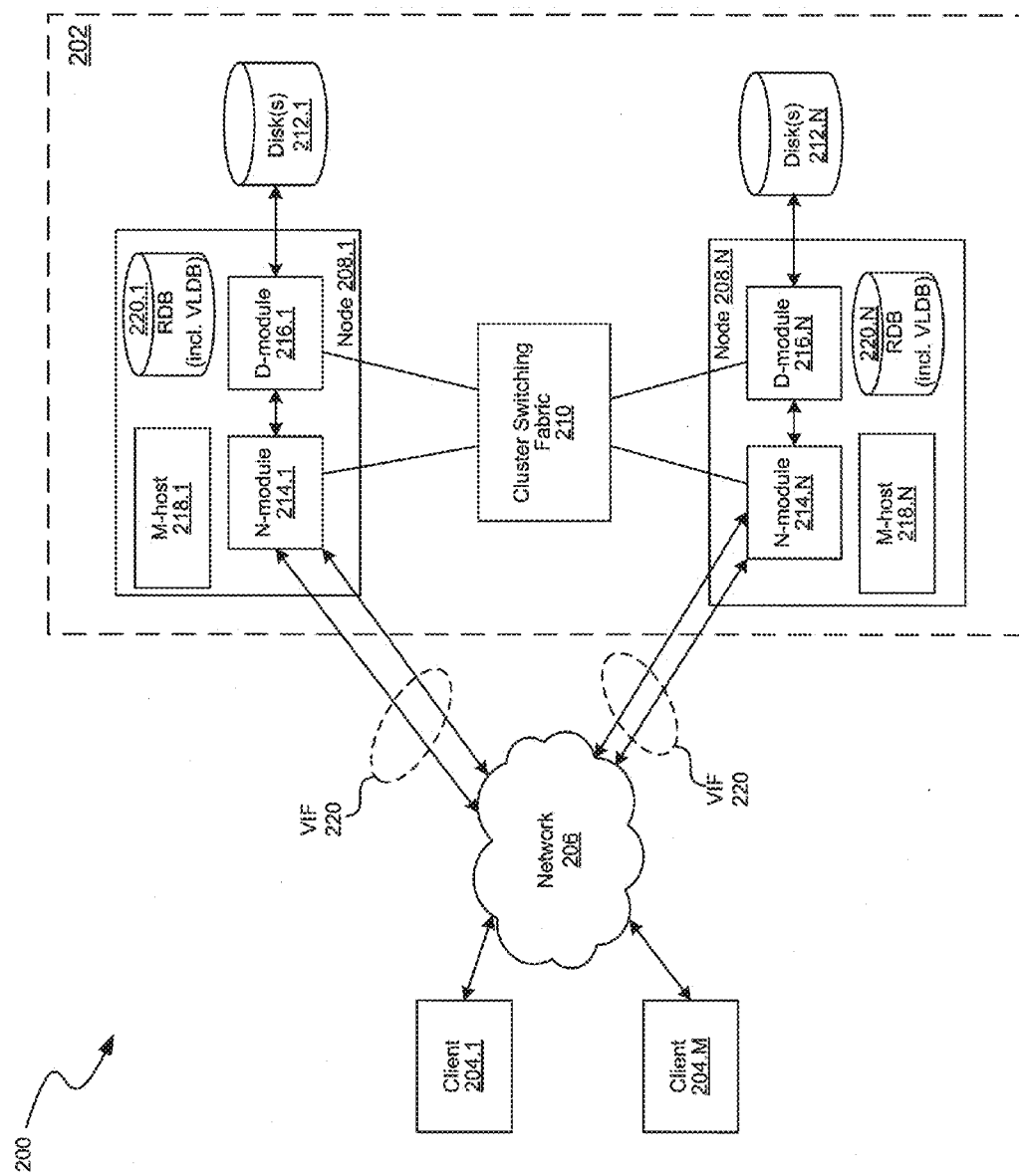
FIG. 2 illustrates a clustered network storage environment in which the present invention can be implemented.

FIGS. 1 and 2 show, at different levels of detail, a network configuration in which the system can be implemented. In particular, FIG. 1 shows a network data storage environment, which includes a plurality of client systems 104.1-104.2, a storage server system 102, and computer network 106 connecting the client systems 104.1-104.2 and the storage server system 102. As shown in FIG. 1, the storage server system 102 includes at least one storage server 108, a switching fabric 110, and a number of mass storage devices 112, such as disks, in a mass storage subsystem 105. Alternatively, some or all of the mass storage devices 212 can be other types of storage, such as flash, SSDs, tape storage, etc.

The storage server (or servers) 108 may be, for example, one of the FAS family of storage server products available from NetApp, Inc. The client systems 104.1-104.2 are connected to the storage server 108 via the computer network 106, which can be a packet-switched network, for example, a local area network (LAN) or wide area network (WAN). Further, the storage server 108 is connected to the disks 112 via a switching fabric 110, which can be a fiber distributed data interface (FDDI) network, for example. It is noted that, within the network data storage environment, any other suitable numbers of storage servers and/or mass storage devices, and/or any other suitable network technologies, may be employed.

The storage server 108 can make some or all of the storage space on the disk(s) 112 available to the client systems 104.1-104.2. For example, each of the disks 112 can be implemented as an individual disk, multiple disks (e.g., a RAID group) or any other suitable mass storage device(s). The storage server 108 can communicate with the client systems 104.1-104.2 according to well-known protocols, such as the Network File System (NFS) protocol or the Common Internet File System (CIFS) protocol, to make data stored on the disks 112 available to users and/or application programs. The storage server 108 can present or export data stored on the disk 112 as volumes to each of the client systems 104.1-104.2. A "volume" is an abstraction of physical storage, combining one or more physical mass storage devices (e.g., disks) or parts thereof into a single logical storage object (the volume), and which is managed as a single administrative unit, such as a single file system. A "file system" is a structured (e.g., hierarchical) set of stored logical containers of data (e.g., volumes, logical units (LUNs), directories, files). Note that a "file system" does not have to include or be based on "files" per se; a file system can be any structured set of logical containers of data, such as files, directories, LUNs, etc. A "block", as the term is used herein, is the smallest addressable unit of contiguous data used by a given storage system to manipulate and transfer data. In conventional storage systems, a block is commonly (though not necessarily) 4 KB in length.

Various functions and configuration settings of the storage server 108 and the mass storage subsystem 105 can be controlled from a management station 106 coupled to the network 106. Among many other operations, a data object migration operation can be initiated from the management station 106.

FIG. 2 depicts a network data storage environment, which can represent a more detailed view of the environment in FIG. 1. Note that the clustered environment of FIG. 2 is only an example of an environment in which the system introduced here can be implemented. The system introduced here can alternatively be implemented in a non-clustered network storage environment. Likewise, the system introduced here is not limited to being implemented within a storage server, i.e., it can be implemented in essentially any form of processing/computing system.

The environment 200 in FIG. 2 includes a plurality of client systems 204 (204.1-204.M), a clustered storage server system 202, and a computer network 206 connecting the client systems 204 and the clustered storage server system 202. As shown in FIG. 2, the clustered storage server system 202 includes a plurality of server nodes 208 (208.1-208.N), a cluster switching fabric 210, and a plurality of mass storage devices 212 (212.1-212.N), which can be disks, as henceforth assumed here to facilitate description. Alternatively, some or all of the mass storage devices 212 can be other types of storage, such as flash memory, SSDs, tape storage, etc. Note that more than one mass storage device 212 can be associated with each node 208.

Each of the nodes 208 is configured to include several modules, including an N-module 214, a D-module 216, and an M-host 218 (each of which can be implemented by using a separate software module) and an instance of a replicated database (RDB) 220. Specifically, node 208.1 includes an N-module 214.1, a D-module 216.1, and an M-host 218.1; node 208.N includes an N-module 214.N, a D-module 216.N, and an M-host 218.N; and so forth. The N-modules 214.1-214.M include functionality that enables nodes 208.1-208.N, respectively, to connect to one or more of the client systems 204 over the network 206, while the D-modules 216.1-216.N provide access to the data stored on the disks 212.1-212.N, respectively. The M-hosts 218 provide management functions for the clustered storage server system 202. Accordingly, each of the server nodes 208 in the clustered storage server arrangement provides the functionality of a storage server.

The RDB 220 is a database that is replicated throughout the cluster, i.e., each node 208 includes an instance of the RDB 220. The various instances of the RDB 220 are updated regularly to bring them into synchronization with each other. The RDB 220 provides cluster-wide storage of various information used by all of the nodes 208, including a volume location database (VLDB) (not shown). The VLDB is a database that indicates the location within the cluster of each volume in the cluster (i.e., the owning D-module 216 for each volume) and is used by the N-modules 214 to identify the appropriate D-module 216 for any given volume to which access is requested.

The nodes 208 are interconnected by a cluster switching fabric 210, which can be embodied as a Gigabit Ethernet switch, for example. The N-modules 214 and D-modules 216 cooperate to provide a highly-scalable, distributed storage system architecture of a clustered computing environment implementing exemplary embodiments of the present invention. Note that while there is shown an equal number of N-modules and D-modules in FIG. 2, there may be differing numbers of N-modules and/or D-modules in accordance with various embodiments of the technique described here. For example, there need not be a one-to-one correspondence between the N-modules and D-modules. As such, the description of a node 208 comprising one N-module and one D-module should be understood to be illustrative only.

Figure 3:
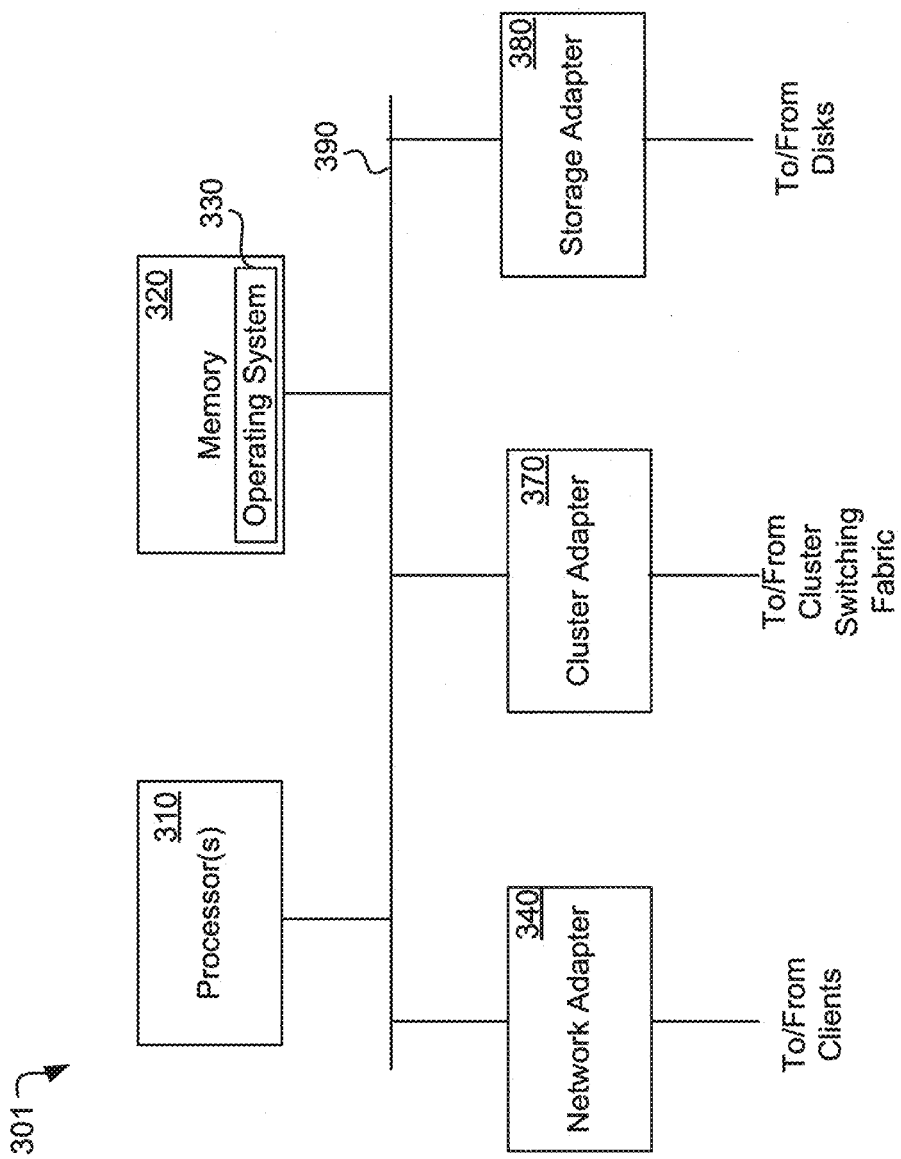
FIG. 3 is a high-level block diagram showing an example of the hardware architecture of a storage controller that can implement one or more storage server nodes.

FIG. 3 is a diagram illustrating an example of a storage controller that can implement one or more of the storage server nodes 208. In an exemplary embodiment, the storage controller 301 includes a processor subsystem that includes one or more processors 310 connected to an interconnect 390. The storage controller 301 further includes a memory 320, a network adapter 340, a cluster access adapter 370 and a storage adapter 380, all interconnected by the interconnect 390. The cluster access adapter 370 includes multiple ports adapted to couple the node 208 to other nodes 208 of the cluster. In the illustrated embodiment, Ethernet is used as the clustering protocol and interconnect media, although other types of protocols and interconnects may be utilized within the cluster architecture described herein. In alternative embodiments where the N-modules and D-modules are implemented on separate storage systems or computers, the cluster access adapter 270 is utilized by the N-module 214 and/or D-module 216 for communicating with other N-modules and/or D-modules of the cluster.

The storage controller 301 can be embodied as a single- or multi-processor storage system executing a storage operating system 330 that preferably implements a high-level module, such as a storage manager, to logically organize the information as a hierarchical structure of named directories, files and special types of files called virtual disks (hereinafter generally "blocks") on the disks. Illustratively, one processor 310 can execute the functions of the N-module 214 on the node 208 while another processor 310 executes the functions of the D-module 216.

The memory 320 illustratively comprises storage locations that are addressable by the processors and adapters 340, 370, 380 for storing software program code and data structures associated with the present invention. The processor 310 and adapters may, in turn, comprise processing elements and/or logic circuitry configured to execute the software code and manipulate the data structures. The storage operating system 330, portions of which is typically resident in memory and executed by the processors(s) 310, functionally organizes the storage controller 301 by (among other things) configuring the processor(s) 310 to invoke storage operations in support of the storage service provided by the node 208. It will be apparent to those skilled in the art that other processing and memory implementations, including various computer readable storage media, may be used for storing and executing program instructions pertaining to the technique introduced here.

The network adapter 340 includes multiple ports to couple the storage controller 301 to one or more clients 204 over point-to-point links, wide area networks, virtual private networks implemented over a public network (Internet) or a shared local area network. The network adapter 340 thus can include the mechanical, electrical and signaling circuitry needed to connect the storage controller 301 to the network 206. Illustratively, the network 206 can be embodied as an Ethernet network or a Fibre Channel (FC) network. Each client 204 can communicate with the node 208 over the network 206 by exchanging discrete frames or packets of data according to pre-defined protocols, such as TCP/IP.

The storage adapter 380 cooperates with the storage operating system 330 to access information requested by the clients 204. The information may be stored on any type of attached array of writable storage media, such as magnetic disk or tape, optical disk (e.g., CD-ROM or DVD), flash memory, solid-state disk (SSD), electronic random access memory (RAM), micro-electro mechanical storage and/or any other similar media adapted to store information, including data and parity information. However, as illustratively described herein, the information is stored on disks 212. The storage adapter 380 includes a plurality of ports having input/output (I/O) interface circuitry that couples to the disks over an I/O interconnect arrangement, such as a conventional high-performance, Fibre Channel (FC) link topology.

Storage of information on disks 212 can be implemented as one or more storage volumes that map to a collection of physical storage devices, which can be divided into one or more RAID groups.

The storage operating system 330 facilitates clients' access to data stored on the disks 212. In certain embodiments, the storage operating system 330 implements a file system that cooperates with one or more virtualization modules to "virtualize" the storage space provided by disks 212. In certain embodiments, a storage manager 460 (FIG. 4) logically organizes the stored data, that described further below. In one embodiment, the storage operating system 330 implements write-anywhere and copy-on-write functionality; that is, any data or metadata can be written to any free physical data block, and a modification to any logical data block is always written to a new physical data block rather than overwriting the original physical data block.

Figure 4:
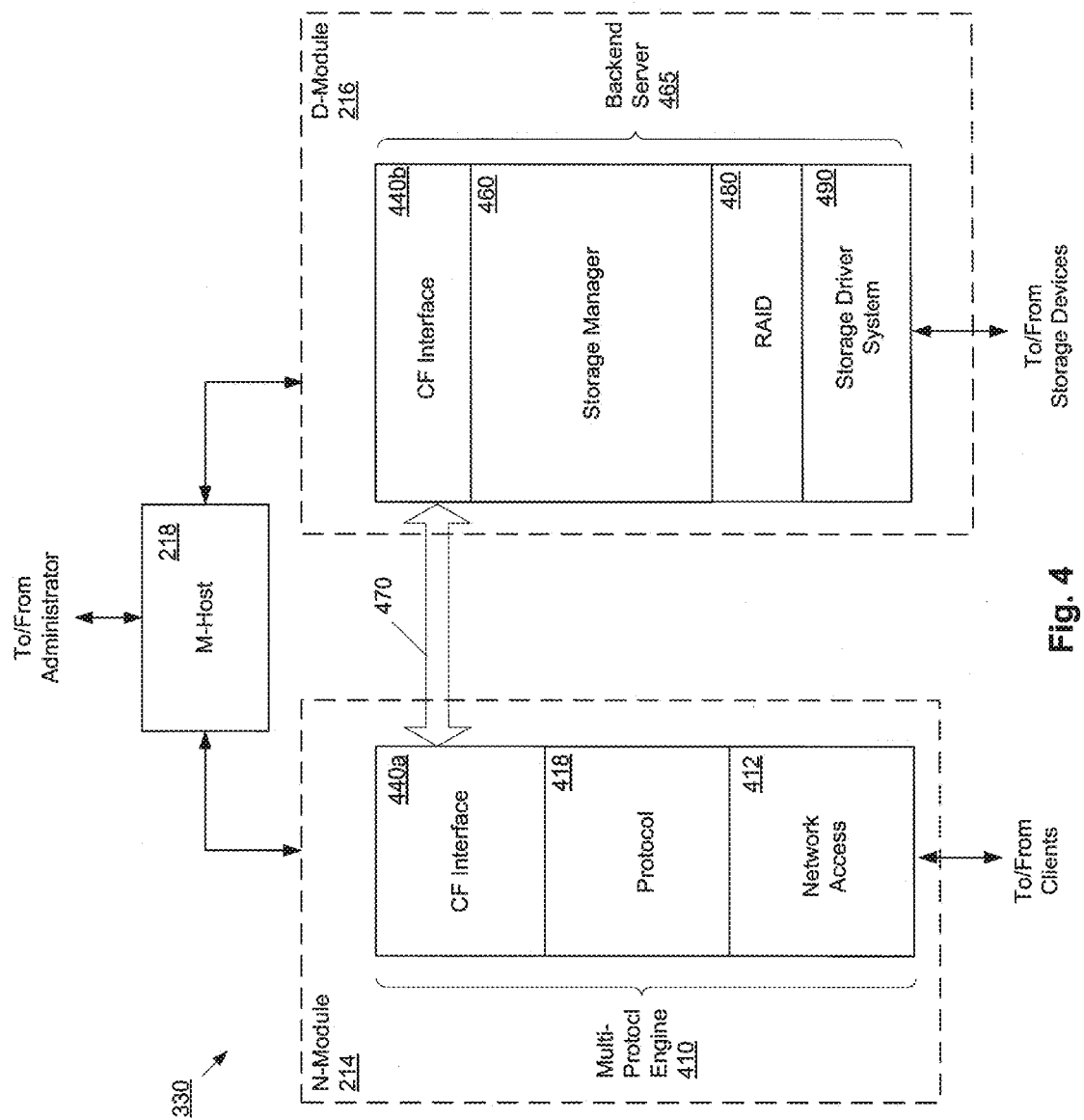
FIG. 4 illustrates an example of a storage operating system of a storage server node.

FIG. 4 is a diagram illustrating an example of storage operating system 330 that can be used with the techniques introduced here. In the illustrated embodiment the storage operating system 330 includes multiple functional layers organized to form an integrated network protocol stack or, more generally, a multi-protocol engine 410 that provides data paths for clients to access information stored on the node using block and file access protocols. The multiprotocol engine 410 in combination with underlying processing hardware also forms the N-module 214. The multi-protocol engine 410 includes a network access layer 412 which includes one or more network drivers that implement one or more lower-level protocols to enable the processing system to communicate over the network 206, such as Ethernet, Internet Protocol (IP), Transport Control Protocol/Internet Protocol (TCP/IP), Fibre Channel Protocol (FCP) and/or User Datagram Protocol/Internet Protocol (UDP/IP). The multiprotocol engine 410 also includes a protocol layer which implements various higher-level network protocols, such as Network File System (NFS), Common Internet File System (CIFS), Hypertext Transfer Protocol (HTTP), Internet small computer system interface (iSCSI), etc. Further, the multiprotocol engine 410 includes a cluster fabric (CF) interface module 440a which implements intra-cluster communication with D-modules and with other N-modules.

In addition, the storage operating system 330 includes a set of layers organized to form a backend server 465 that provides data paths for accessing information stored on the disks 212 of the node 208. The backend server 465 in combination with underlying processing hardware also forms the D-module 216. To that end, the backend server 465 includes a storage manager module 460 that manages any number of volumes 472, a RAID system module 480 and a storage driver system module 490.

The storage manager 460 primarily manages a file system (or multiple file systems) and serves client-initiated read and write requests. In at least one embodiment the storage manager 460 implements the volumes/regions/extents/slabs based storage techniques introduced here. The RAID system module 480 manages the storage and retrieval of information to and from the volumes/disks in accordance with a RAID redundancy protocol, such as RAID-4, RAID-5, RAID-DP or declustered RAID (discussed below), while the disk driver system 490 implements a disk access protocol such as Serial ATA (SATA), SCSI or FC protocol (FCP).

The backend server 465 also includes a CF interface module 440b to implement intra-cluster communication 470 with N-modules and/or other D-modules. The CF interface modules 440a and 440b can cooperate to provide a single file system image across all D-modules 216 in the cluster. Thus, any network port of an N-module 214 that receives a client request can access any data container within the single file system image located on any D-module 216 of the cluster.

The CF interface modules 440 implement the CF protocol to communicate file system commands among the modules of cluster over the cluster switching fabric 210 (FIG. 2). Such communication can be effected by a D-module exposing a CF application programming interface (API) to which an N-module (or another D-module) issues calls. To that end, a CF interface module 440 can be organized as a CF encoder/decoder. The CF encoder of, e.g., CF interface 440a on N-module 214 can encapsulate a CF message as (i) a local procedure call (LPC) when communicating a file system command to a D-module 216 residing on the same node or (ii) a remote procedure call (RPC) when communicating the command to a D-module residing on a remote node of the cluster. In either case, the CF decoder of CF interface 440b on D-module 216 de-encapsulates the CF message and processes the file system command.

In operation of a node 208, a request from a client 204 can be forwarded as a packet over the network 206 and onto the node 208, where it is received at the network adapter 340 (FIG. 3). A network driver of layer 412 processes the packet and, if appropriate, passes it on to a network protocol and file access layer for additional processing prior to forwarding to the storage manager 460. At that point, the storage manager 460 interprets the request and generates operations to load (retrieve) the requested data from the RAID system 480 if it is not resident in memory 320. The storage manager 460 determines in which extent and in which region the data resides. The region receives a request for that (portion of) extent and in turn determines the slab(s) containing the requested data. The request is then handed to the RAID system module 480 for further processing and the determination of which storage device(s) hold the data, before issuing requests to the appropriate storage device driver(s). The storage device driver(s) access(es) the data from the specified device(s) and loads the requested data block(s) in memory for processing by the node. Upon completion of the request, the node (and operating system) returns a reply to the client 204 over the network 206.

The data request/response "path" through the storage operating system 330 as described above can be implemented in general-purpose programmable hardware executing the storage operating system 330 as software or firmware. Alternatively, it can be implemented entirely or partially in specially designed hardware. That is, in an alternate embodiment of the invention, some or all of the storage operating system 330 is implemented as logic circuitry embodied within, for example, one or more field programmable gate arrays (FPGAs), application specific integrated circuits (ASICs), programmable logic devices (PLDs), or some combination thereof.

The N-module 214 and D-module 216 each can be implemented as processing hardware configured by separately-scheduled processes of storage operating system 330; however, in an alternate embodiment, the modules may be implemented as processing hardware configured by code within a single operating system process. Communication between an N-module 214 and a D-module 216 is thus illustratively effected through the use of message passing between the modules although, in the case of remote communication between an N-module and D-module of different nodes, such message passing occurs over the cluster switching fabric 210. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF API.

III. System Internal Functionality and Architecture

The following is a description of the internal functionality and architecture of an illustrative system that can be used to practice the techniques described with reference to FIGS. 12-14 discussed below. Of course, it is understood that the following system architecture and functionality is defined only for convenience in understanding an exemplary mechanism by which the techniques may be practiced. Other mechanisms, with different architectures and internal functionalities may also be used to practice the techniques discussed herein, as long as the overall physical-to-logical storage hierarchy (such as the generic architecture discussed further below with reference to FIG. 12) is maintained.

Figure 5:
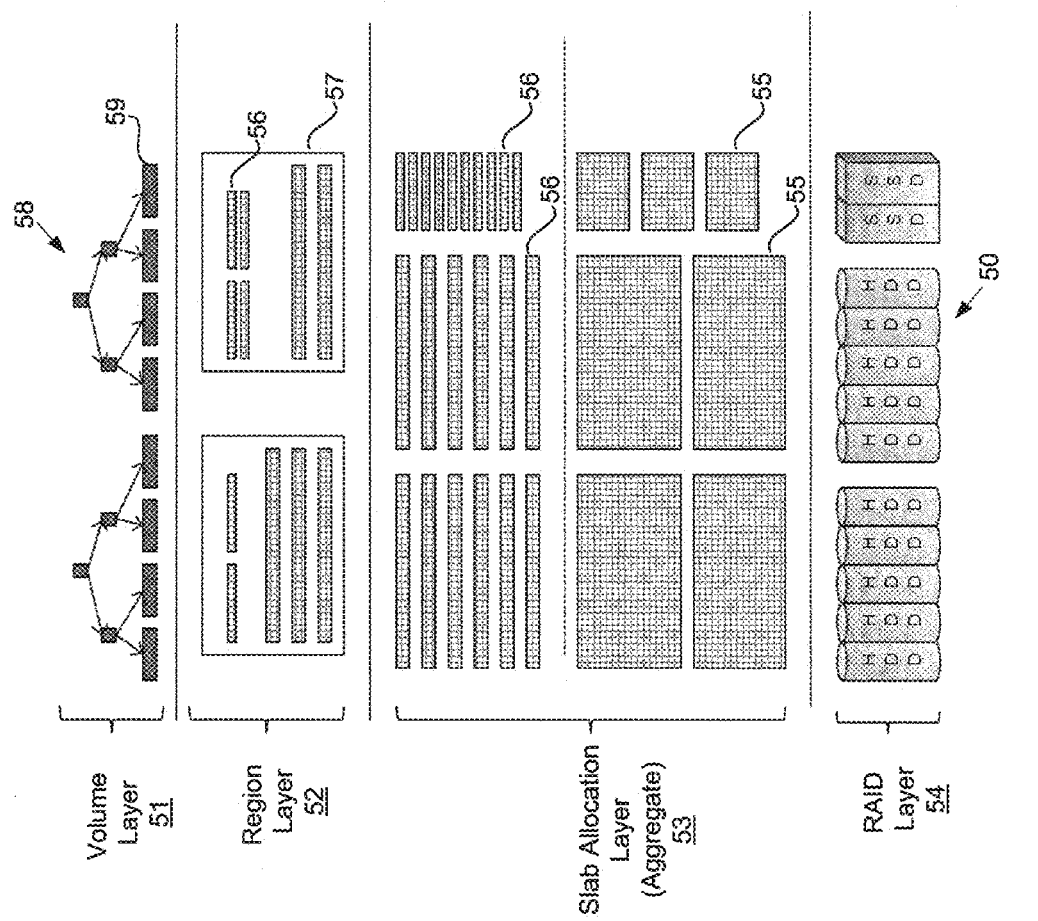
FIG. 5 shows various layers of data storage in accordance with the technique introduced here.

The system described here includes a file system and layout engine. As shown in FIG. 5, in one embodiment, the system provides several distinct data layers, including: an aggregate layer (also called "slab allocation layer") 53 which sits on top of the RAID layer 54; a region layer 52 which sits on top of the aggregate layer 53; and a volume layer (also called "file system layer") 51 which sits on top of the region layer 52. In one embodiment, these layers are implemented by the storage manager 460 (FIG. 4) in the D-module 216 of each node 208 in a storage cluster, as discussed further below.

In one embodiment, the system divides RAID groups 50 into two-dimensional arrays 55 of data blocks and then further divides up those arrays into "slabs" 56. Slabs 56 can be defined along RAID stripe boundaries. The block arrays 55 and slabs 56 are contained within the aggregate layer 53. The system further defines multiple "regions" 57 to contain data in the region layer 52. Each region can include one or more logical extents 59 (not shown in the region layer 52 in FIG. 6, for simplicity). Allocated to each extent 59 is at least a portion of one or more slabs 56 that are allocated to the region that includes the extent.

The system also maintains multiple volumes 58, or file systems, as logical containers of data in the volume layer. Each volume 58 includes one or more of the logical extents 59 from one or more of the regions 57. Notably, the region layer 52 hides the layouts of the logical extents within the various regions 57 from the volume layer 51 (and therefore, from the clients and users).

The various slabs 56 can be defined from a heterogeneous pool of physical storage devices, and any given region 57 can include extents built from slabs of two or more different types of physical storage device, such as flash memory, solid-state drives (SSDs), HDDs, etc. By their nature, these types of physical storage devices have different reliability characteristics. Accordingly, the slabs defined from the different physical storage devices have different reliability characteristics. In embodiments, the various slabs 56 are defined using a block of storage area (or storage slices) selected from multiple physical storage devices, where the storage areas use a common parity-based protection scheme against data loss. Accordingly, in such embodiments, the various slabs 56 would each correspond to a particular parity group. Here, each slab may be envisioned as an abstraction of a parity group to corresponding upper layers.

Figure 6:
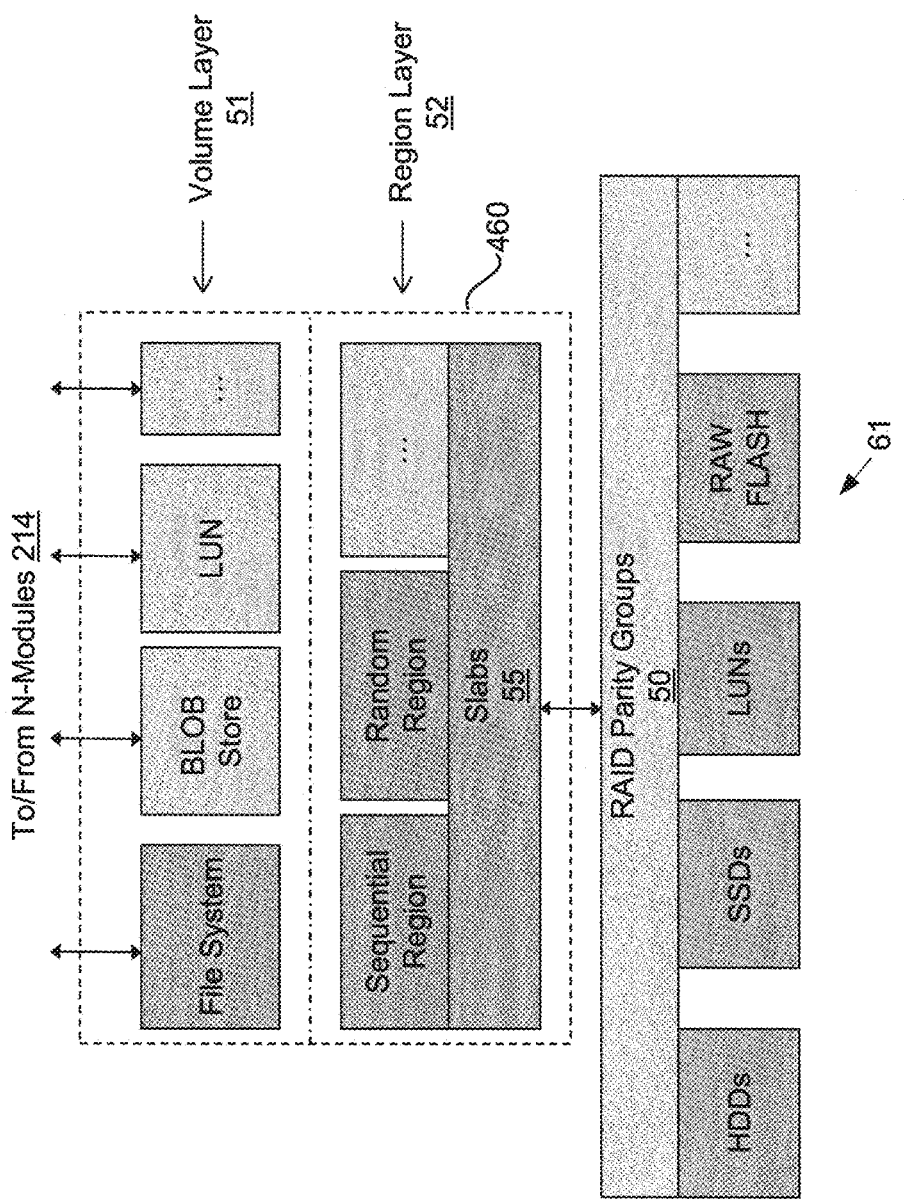
FIG. 6 illustrates an example of particular types of data layers.

FIG. 6 illustrates an example of particular types of data layers. The region layer 52 can include, for example, a sequential access region, a random access region, and one or more regions of various other types/purposes. The volume layer 51 can include, for example, a conventional file system, a binary large object (BLOB) store, a LUN and one or more volumes of various other types/purposes. Also as shown in FIG. 6, the physical storage devices 61 from which the slabs are obtained can include, for example, HDDs, SSDs, foreign LUNs, raw flash, etc.

Figure 7:
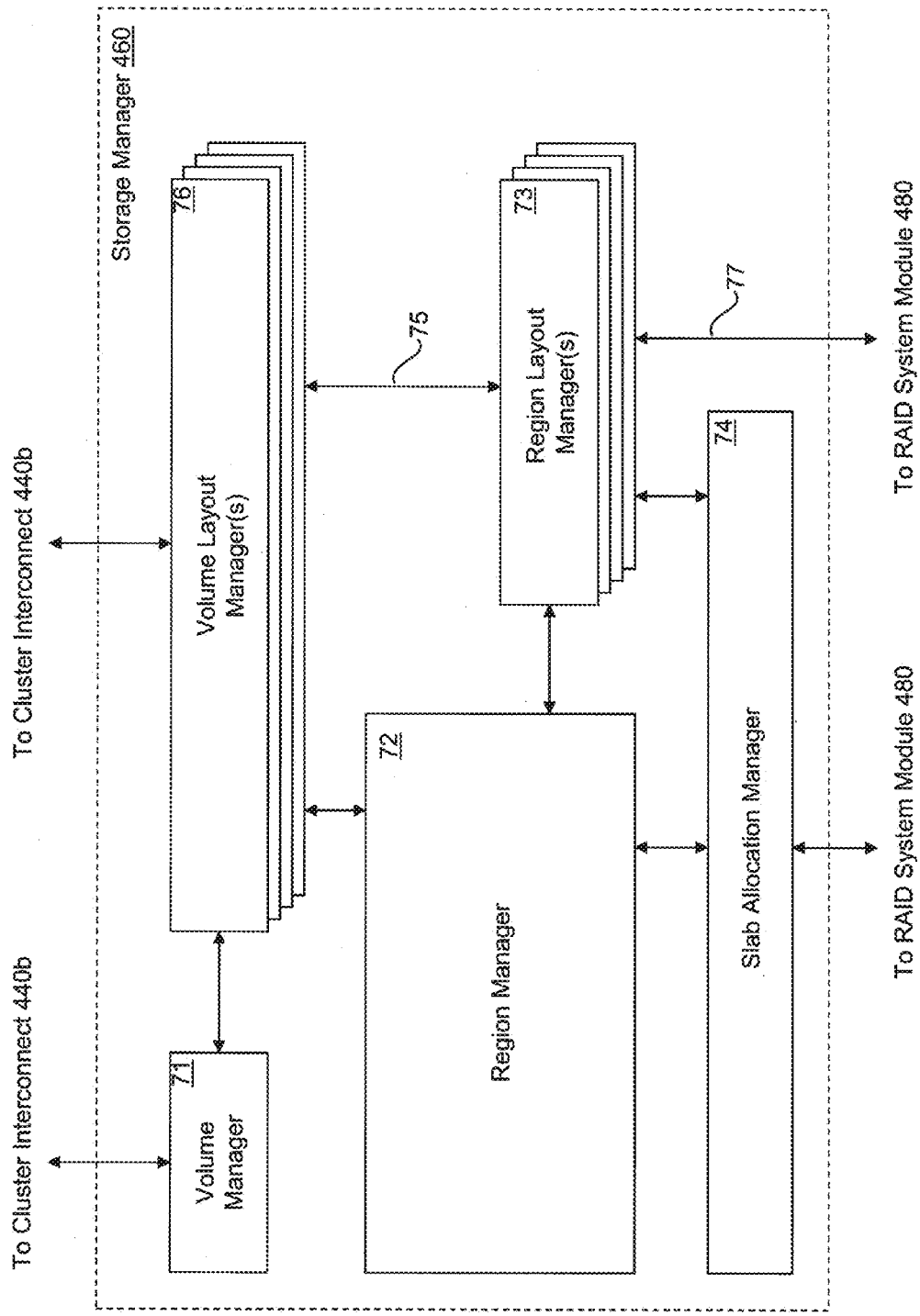
FIG. 7 illustrates the details of the storage manager, according to one embodiment.

FIG. 7 illustrates the details of the storage manager 460, according to one embodiment. In the illustrated embodiment, the storage manager for 60 includes a volume manager 71, one or more volume layout managers 76, a region manager 72, one or more region layout managers 73, a slab manager 74, a regions/extents interface 75 and a block I/O interface 77.

The volume layer 51 is created and managed by the volume manager 71. The volume manager 71 handles the creation and deletion of volumes. The storage manager 460 includes a volume layout manager 76 for each type of volume in the volume layer 51. Each volume layout manager 76 implements the internal organization of the corresponding volume type and is responsible for assembling externally visible data objects (e.g., files or LUNs) from extents. It also implements whatever naming scheme is appropriate for the volumes' objects (e.g., hierarchical pathnames for traditional file systems, LUN IDs for a LUN volume, etc.).

Below the volume manager 71 are a region manager 72 and a region layout manager 73, which provide and manage regions. The region manager 72 manages the overall population of regions associated with the storage manager 460. It decides on the assignment of individual extents to a suitable region (e.g., one that includes slabs of physical storage of particular characteristics). The region manager 72 also decides when new regions are needed and what type(s) they should be, and it creates them. It also monitors size and free space of regions. For example, the region manager 72 might decide that a region has grown too large and split it into two smaller regions, or it might ask a region with a lot of free space to return one or more slabs to the slab allocation manager 74. When the volume layer 51 needs to create new extents, the region manager 72 decides in which region(s) to place the extents.

The storage manager 460 creates a separate region layout manager 73 for each region in the region layer 52. Each region layout manager 73 is responsible for managing the internal functionality of the corresponding region, and in particular, for determining the actual physical placement of data within the region. More specifically, a region layout manager 73 determines the allocation of the individual extents to the physical storage blocks within the slabs that make up the corresponding region (i.e., it makes layout decisions for the extents stored in the region corresponding). Each region layout manager 73 also manages and determines format and storage locations for its region-internal metadata. Each region layout manager 73 provides a block I/O interface 77 to the RAID layer.

The region/extents interface 75 provides communication between the volume manager 71 on one hand and the region manager 72 and region layout manager 73 on the other hand. The slab allocation manager 74 sits below the region manager 72 and region layout manager 73 and above the RAID system module 480 (which implements the RAID layer) and is responsible for creating and allocating slabs. The slab allocation manager 74 allocates slabs in response to requests from region layout managers 73. It has the global knowledge of how many slabs of each type exist, and it can inform the region manager 72 when it is low on a particular type of slab, causing the region manager 72 to identify regions that are underutilizing (and can therefore release) slabs of that type. The slab allocation manager 74 requests parity groups from the RAID system module 480, from which it carves out slabs.

In one embodiment, the RAID layer is implemented as "declustered" RAID. Declustered RAID is a RAID implementation that slices individual physical devices in the heterogeneous pool into storage areas or "slices" and then assembles the slices from different devices into different parity groups, where each parity group comprises slices or storage areas that have at least a common parity-based protection scheme against data loss. In embodiments, the slices within each parity group may have other common physical characteristics (e.g., type of physical storage device) in addition to the common parity-based protection scheme characteristic. The size of the parity groups are not tied to the physical size of the storage devices in the pool.

Figure 8:
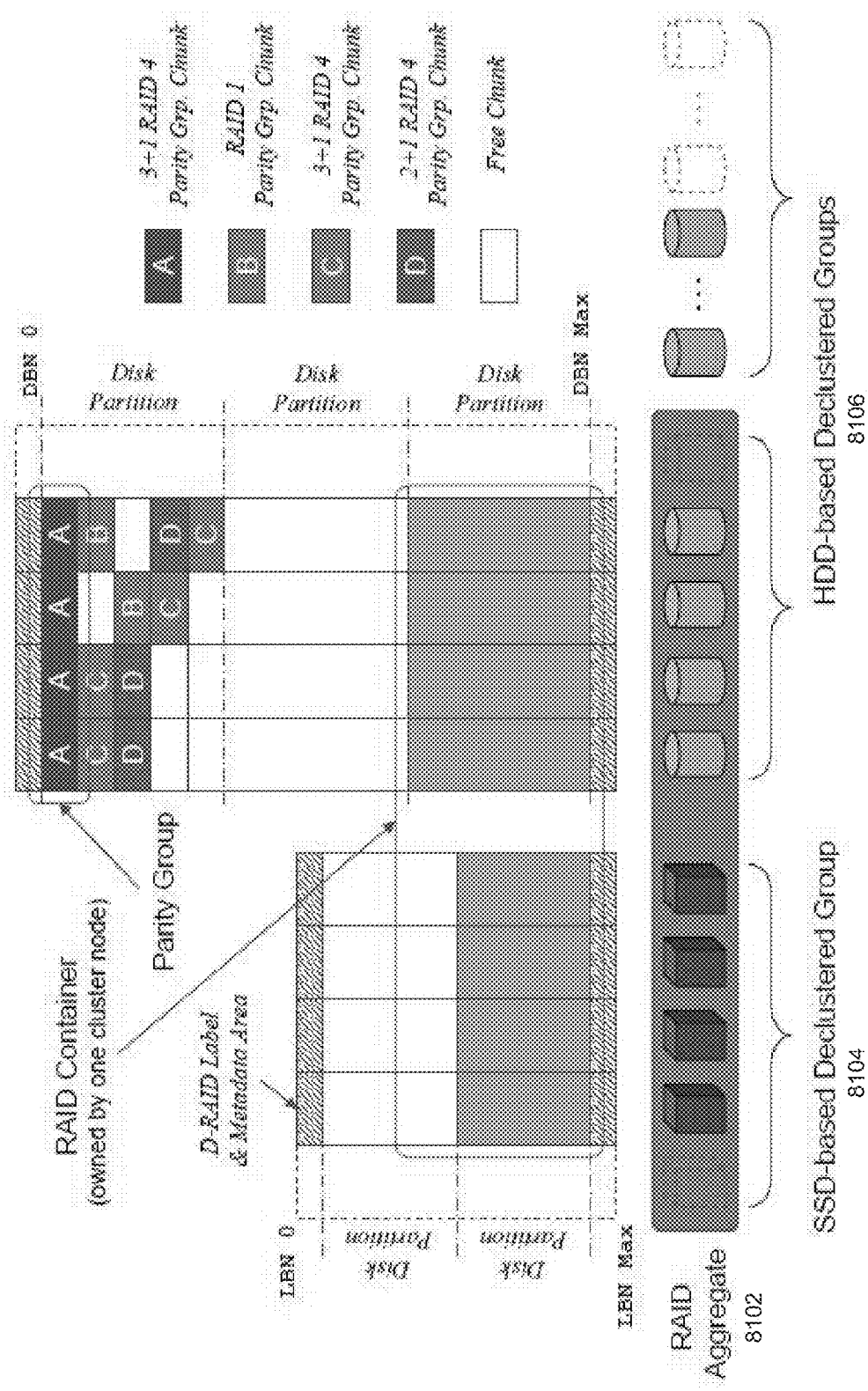
FIG. 8 illustrates how parity groups are constructed from a RAID group.

In one illustrative embodiment, as shown in FIG. 8, parity groups are constructed from selected storage devices or elements from the various RAID groups. For example, a RAID aggregate 8102 may include a first group that is comprised of SSD RAID elements 8104. A second RAID group may be comprised of HDD RAID 8104 elements. Disks (or other such storage elements) are selected from the various RAID groups and selectively built in to various parity groups. For example, parity group A may include slices of disks selected from the various RAID groups of the RAID aggregate 8102 that have a particular parity-based protection scheme (e.g., 3+1 RAID 4) against data loss. Similarly, parity group B includes slices of disks selected from RAID groups, where the selected slices have a second type of parity protection scheme. As illustrated in the exemplary embodiment in FIG. 8, the slices of disks having a common parity protection scheme (from the different parity groups) are slid in to form different parity groups (e.g., parity group A, parity group B, etc.).

Above the parity groups, the slab allocation layer 53 takes the two-dimensional arrays of blocks and carves them along stripe boundaries into many much smaller slabs of storage. The number of stripes in a slab is related to the underlying physical storage type; for example, HDD slabs may be at least few tracks long, while SSD slabs may be at least an erase block long. At the same time, slabs are kept relatively small because they are the basic unit of space allocation to the next higher level in the system, i.e., the regions.

A region holds logical (virtualized) extents of data. Each extent is simply a range of bytes of data or metadata stored in a region and accessed via an extent identifier (ID). Reference counts for extents are maintained within the region, allowing for external sharing of extents. The layout and location of an extent within a region is hidden from the users of the extent (i.e., from volumes, clients, end users).

The virtualization of extents within regions is an architectural advantage for the system. Traditional file systems manage the performance, space efficiency and reliability of an extent of data through direct control of the layout of the data. In the system described here, expectations are expressed, for example, through the SLO of an extent. A region completely hides the details of the location of the data and how the SLO is honored. This gives the region the latitude to implement algorithms such as compression or storing very similar extents together, sharing most of their data blocks and the few divergences.

Figure 9:
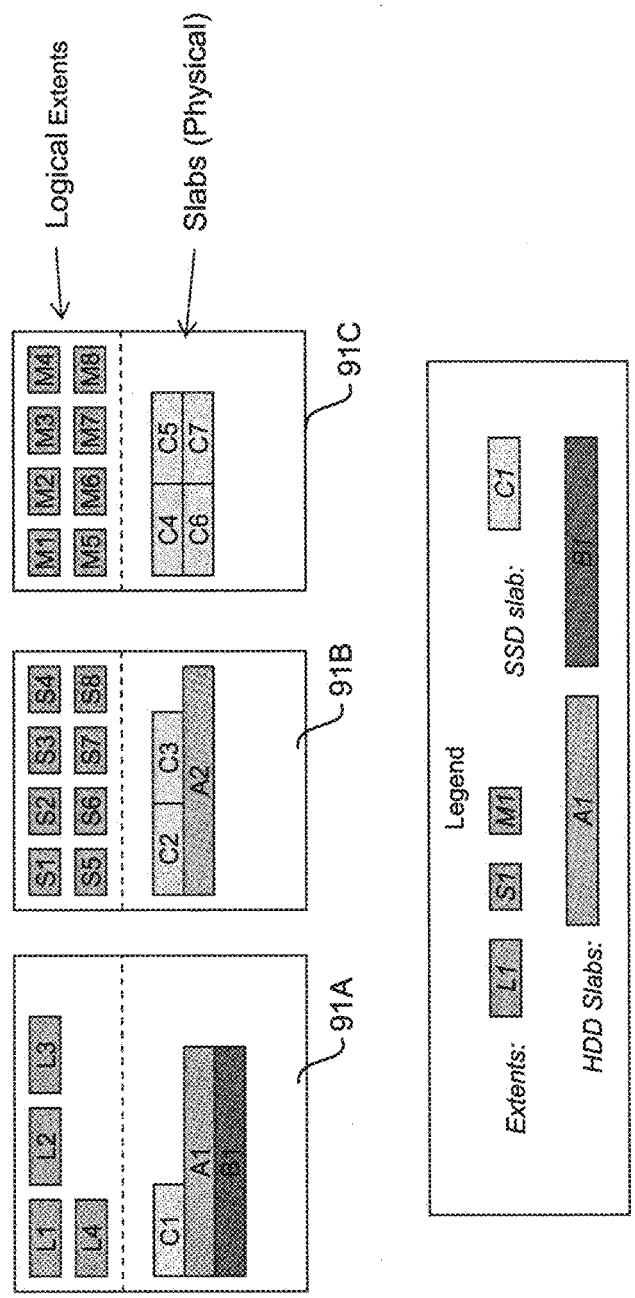
FIG. 9 illustrates an example of the layering within regions which include extents.

The isolation of the internal structure of regions allows for the implementation of multiple internal region layout manager entities which optimize the organization of the internals of the region for specific workloads. Different regions can be optimized for different purposes, including different internal layouts and algorithms as well as dynamically shifting mixes of underlying storage. Extents with very different SLOs can be stored in different regions. For example, in FIG. 9 there are shown three types of extents, namely, LUN data ("L"), small file data ("S") and metadata ("M"). These three types of extents are stored in three specialized regions, 91A, 91B and 91C, each with its own internal format to map each extent ID to its storage. The different regions 91A, 91B and 91C are also using different mixes of storage slabs, as dictated by their need to satisfy the SLOs on their extents.

Figure 10:
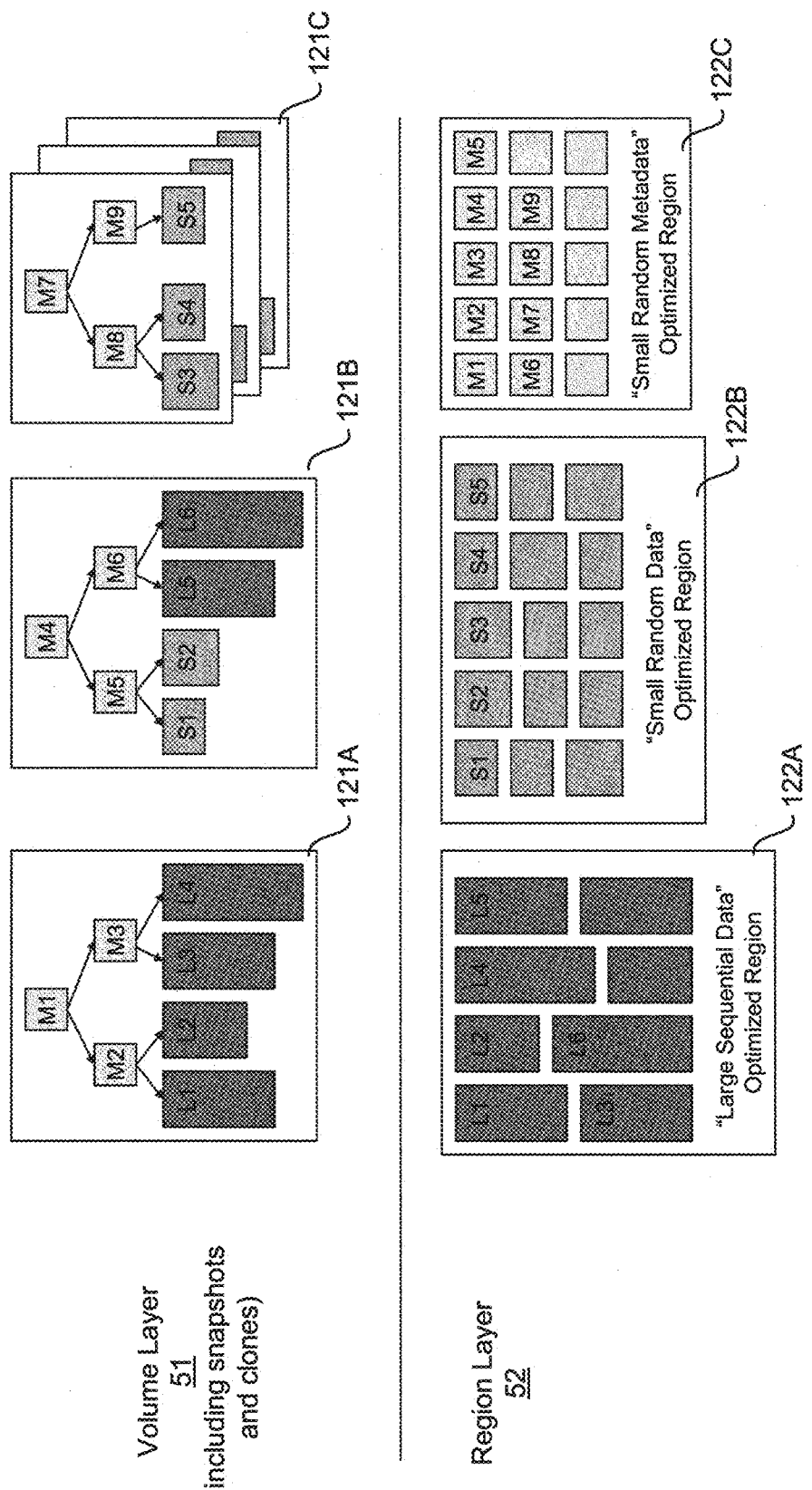
FIG. 10 illustrates how volumes can be represented as trees of extents that are contained within regions.

The top layer of the system is the volume layer 51. As shown in FIG. 10, volumes can be structured as trees of variably sized extents. Bottom-level extents hold the data of the volume, while higher-level extents store the metadata that organizes the lower-level extents. In the example of FIG. 10, three volumes, 121A, 121B and 121C, in an aggregate are each made up of a tree of extents, where the extents are maintained in three separate regions, 122A, 122B and 122C. Each volume contains data as well as metadata. Further, it can be seen that volume 121B includes two different classes of data, as well as metadata. The different classes of data and the metadata have different SLOs and so are stored in different types of regions. Administrators can express their preferences for data sets through options in data management software (the details of which are not germane to the techniques introduced here). These preferences are translated into objectives (expectations) on the particular volumes 121A, 121B and 121C and data objects within them and eventually to objectives on the different data and metadata extents. At the region level 52, all objectives with regard to the performance, space efficiency and reliability of the extents are conveyed through the SLO of the extent.

Referring again to FIG. 6, the system allows for different volume types. All data and metadata is stored in files, and each file is a tree of extents rooted at the file's inode (primary metadata container). The inode itself can be stored in the data extents of a separate inode file.

As is discussed in greater detail below, the SLOs of metadata allow a volume to specially treat high level metadata, such as volume-level metadata blocks. The system can store the high level metadata needed to boot the aggregate in special purpose regions, allowing rapid boot, takeover and high-level repair. By storing critical metadata in storage with a high-level RAID redundancy, the system can reduce the exposure to repair related downtime.

Figure 11:
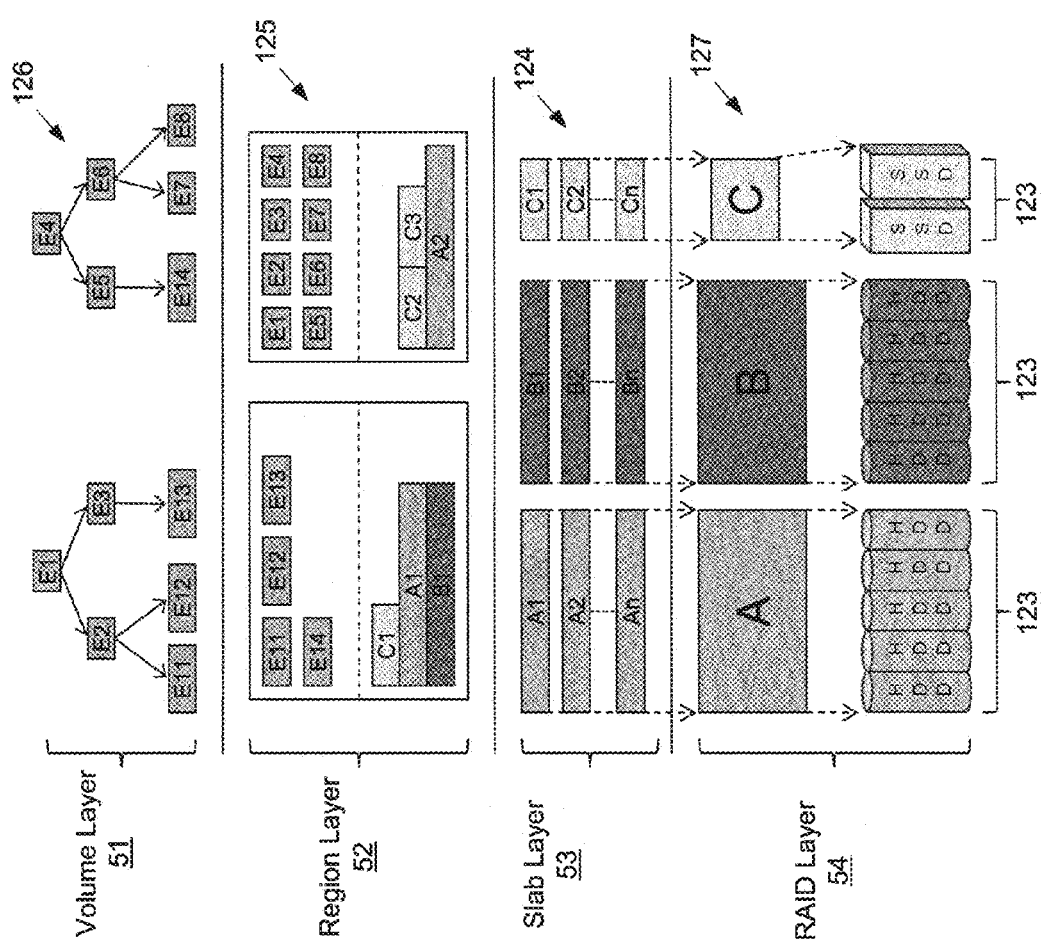
FIG. 11 illustrates an example of the various data layers from the volume level down to the RAID level.

An example of a hierarchy of all of these layers is illustrated in FIG. 11. The RAID system module 480 has assembled slices of HDDs and SSDs into virtualized RAID groups and assembled those RAID groups into an aggregate. The slab allocation layer 53 sees these parity groups as large arrays 127 of blocks, which it cuts into slabs. Hence, the system has sliced the parity groups 123 into slabs 124 and allocated some of those slabs 124 into two regions 125. The two regions 125 are holding different classes of data (extents) from the two volumes 126 above them. Finally, the data in the volumes 126 is exported through the CF interface 440b (FIG. 4).

The access path to a data container can be similar to that in a conventional file system. For example, each container can be identified in the storage cluster by its unique ID. The N-modules 214 route data to the appropriate D-module 216 using the container's unique ID stored in a system-wide map (e.g., the VLDB).

IV. RAID/Storage Manager Interface

In one embodiment, the RAID layer (or more precisely, the RAID system module 480) communicates a list of its parity groups to the storage manager 460. For each parity group, the RAID layer informs the storage manager 460 of the parity groups' width, i.e., the number of slices mapped to different devices that can hold data, number of blocks, block size, type of physical device (e.g., HDD, SSD) and potentially subtypes (e.g., RPM, inside tracks, etc.). Since there are generally massive commonalities between parity groups within a RAID group or aggregate, this can be achieved with a single type field and a table lookup. The system can tag blocks written to RAID with the triplet (parity group ID, slice number, block offset).

V. Slabs

As described above, the slab allocation layer 53 takes the parity groups supplied by RAID and carves them into slabs which are smaller subarrays of blocks allocated from the parity group's larger array. Slabs inherit their performance and reliability traits from their parity group. They are allocated as a range of parity stripes, so the width of all slabs on a parity group is uniform within the group. The degree of freedom in slab allocation is the number of stripes in the slab. Slabs can be created in a range of standard sizes and can be subdivided or combined as needed. On spinning media (e.g., HDDs), a minimum slab length may be chosen to approximate a small multiple of track size, while on SSDs or storage attached flash the minimum slab length may be an erase block, for example.

VI. Regions

Regions are virtual (logical) storage containers that use a collection of slabs to hold logical extents of reference counted data. A region will "know" at least some physical and reliability characteristics of each slab that is allocated to it, including:

- How efficient that type of slab is for sequential and random I/O (this is one way the system can distinguish flash from HDD).
- Ideal I/O size (e.g., for disk slabs the underlying disks' track size)
- Parallelism, i.e., the number of distinct devices making up the slab. For RAID this will be the number of data drives.
- Reliability level information corresponding to the slab (e.g., a parity-based protection scheme that commonly applies to the underlying storage blocks)

VII. Extents

A file (within a volume) is made up of one or more extents, which are contained within one or more different regions. An extent is a logical piece of data. Different extents can be of different sizes. In one embodiment, extents can be relatively large, e.g., on the order of many tens of MB. For each extent, the region also stores an "extent descriptor," which is a collection of metadata about the extent (similar to an inode). The extent descriptor will keep information such as the extent's size, when it was created, and its SLO. The extent descriptor is also used by the region layout manager 73 to translate from logical addresses in the extent to physical addresses in the storage managed by the region. This can be done by using a buffer tree similar to that used by conventional block-oriented file systems.

The above description provided the internal functionality and architecture of an illustrative system that can be used to practice the techniques described with reference to FIGS. 12-14 discussed below. As indicated above, it is understood that the above system architecture and functionality is illustrative, and other systems, with different architectures and internal functionalities may also be used to practice the techniques discussed in the following sections, as long as the overall physical-to-logical storage hierarchy (such as the generic architecture discussed further below with reference to FIG. 12) is maintained.

IX. Allocation of Physical Storage Blocks Based on Reliability SLOs

As noted above, the system described here can dynamically manage data allocation in the physical layer (e.g., the RAID layer) according to reliability information associated with higher-level logical data (e.g., volume level data). The major principle here is that, toward implementing a "service level storage system", the system can use, for example, SLOs to determine the type of reliability required for allocating a particular logical entity (e.g., a volume, a file, a directory, etc.), and then allocate physical data storage blocks for the logical entity based on the reliability.

In embodiments, the system allocates data corresponding to the logical entity to a particular parity group based on the reliability value associated with the logical entity. For example, SLOs may define a high reliability requirement for logical entities representing an important project workspace (e.g., a directory or a volume corresponding to a company's vital employee profile management project) and a low reliability requirement for logical entities representing unimportant and temporary storage areas (e.g., a directory designated as "scratch" space for holding temporary files). The system, in embodiments, allocates physical storage blocks for each logical entity based on the reliability definitions. For example, data corresponding to the project workspace is allocated to physical storage blocks from, for example, a parity group that has high protection level (e.g., RAID-DP). Data corresponding to the scratch space is allocated to physical storage blocks from, for example, a parity group that has a lesser protection level (e.g., RAID-1).

In particular, such reliability SLO based allocation allows the system to make perform efficient data operations. For example, the system prioritizes the execution of background maintenance operations (e.g., disk consistence checks) based on the reliability level associated with the various parity groups. In an illustrative embodiment, the reliability level of the various parity groups are encoded within the metadata associated with the parity groups. Prior to running a background maintenance operation on a given physical storage element (e.g., a hard disk), the system retrieves a list of parity groups the physical storage element participated in, and orders the list according to the reliability levels associated with the parity groups. Subsequently, the system prioritizes operations according to the ordered list. In one example of a prioritized operation, the system may run more frequent background maintenance operations on parity groups (i.e., storage blocks comprised in parity groups) with high reliability values and occasional background maintenance operations on parity groups with lower reliability values. This way, the system's resources are freed up and used more effectively in performing maintenance operations on important blocks, instead of uniformly spending the resources across all parity groups.

In another example of such reliability SLO based data operations, the system prioritizes reconstruction of failed physical storage elements (e.g., a failed drive) based on the reliability levels or values associated with the various parity groups of the system. For example, upon detecting a failed drive, the system identifies the list of parity groups the drive participated in, and orders the parity groups according to their associated reliability values. Storage blocks in the parity groups with the highest reliability values are reconstructed first. The remaining parity groups are reconstructed according to the prioritized order based on the reliability values. In some instances, the reconstruction may also be dynamically scheduled such that the high reliability parity groups are reconstructed first, and the lower reliability parity groups are scheduled for reconstruction during system idle times.

It is understood that such reliability-based prioritized execution of operations, based on reliability levels attached to the parity groups (according to, for example, reliability SLO targets of corresponding logical entities), may be extended to other data operations (e.g., snapshot creation, data deduplication, or other such operations as understood by a person of ordinary skill in the art.) related to the physical storage blocks. The above reliability-based operations are further illustrated in detail with reference to FIG. 12 below.

Figure 12:
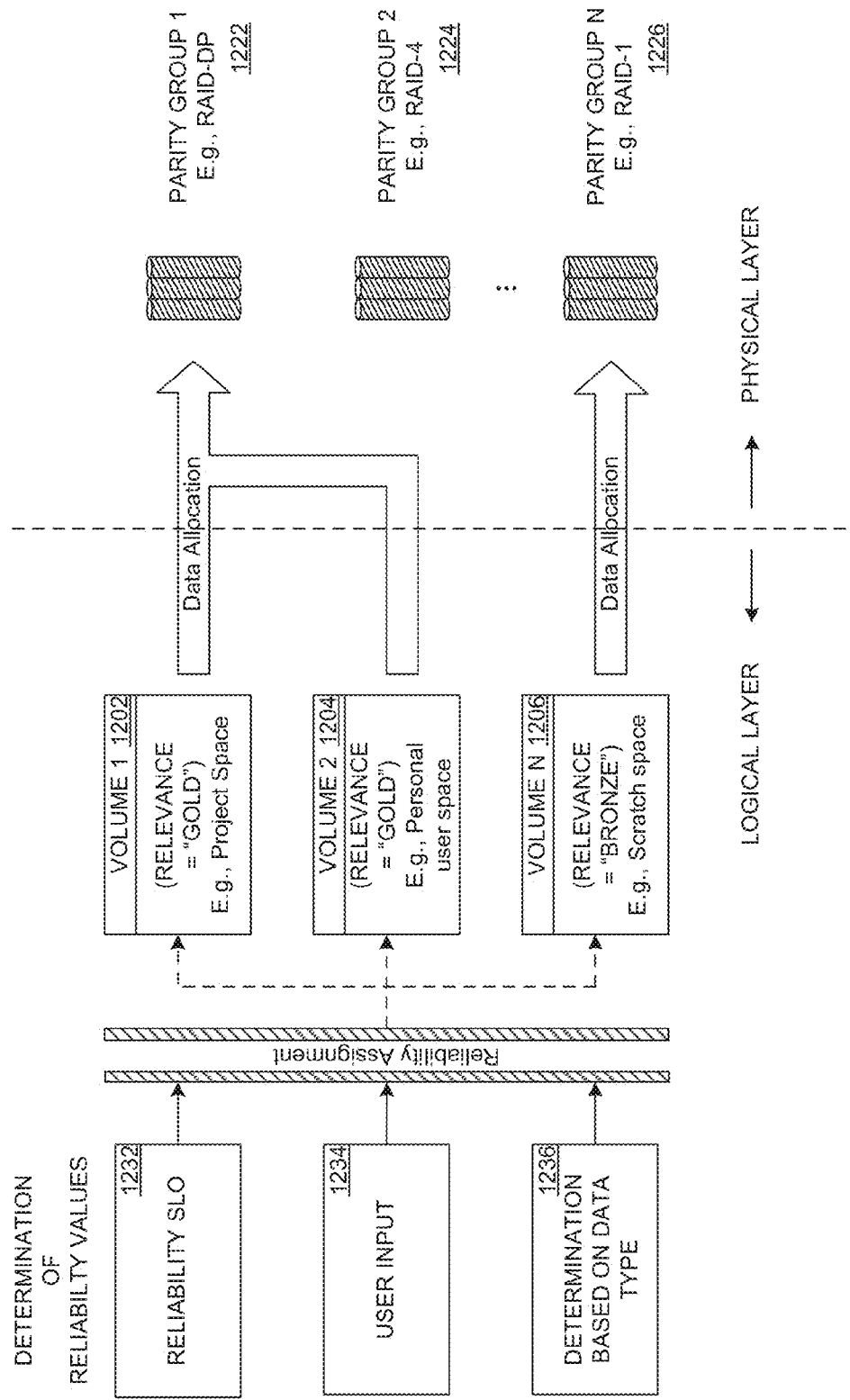
FIG. 12 illustrates an example of physical storage allocation according to reliability values associated with logical entities.

FIG. 12 illustrates an example of physical storage allocation according to reliability values associated with logical entities. FIG. 12 represents a high-level illustration of a system architecture showing the interplay between logical entities and corresponding physical storage elements of a storage system. In the way of a non-limiting example, the above exemplary architecture discussed with reference to FIGS. 5-11 are used to describe how the reliability information is relayed from the logical entity to the physical storage blocks.

The system first attaches the reliability value information to an entity (e.g., volume 1202) in the logical layer. In embodiments, the reliability value information is stored along with metadata attached to the logical entity. The reliability value may be assigned in one of several ways. In one embodiment, the reliability value is determined based on objectives or targets established by storage SLOs, as indicated in block 1232. While many different characteristics can be captured in storage SLOs (e.g., latency, throughput, reliability, availability, etc.), to simplify description the following discussion will only cover reliability SLOs. An SLO can be embodied as a key-value pair. SLOs can express reliability values based on particular data-types or based on where the data is stored. For example, SLOs may define data stored in project spaces or personal work-directories as "gold" reliability standards, and may define data stored in temporary "scratch" spaces as "bronze" reliability standards. Alternately, or in addition to such standards, SLOs may define ranking of volumes based on user-assigned settings to the volumes or even the logical data (e.g., files, directories, etc.) stored in volumes. In one embodiment, therefore, a storage SLO assigns a reliability level for each high-level logical entity (e.g., volume 1202) of the storage system. The reliability value indicated by the SLO is stored or attached to the metadata of the high-level logical entity 1202.

In embodiments, the reliability values may be assigned to a high-level logical entity 1202 based on inputs received from a user of the storage system, as indicated in block 1234 of FIG. 12. For example, an administrator establishing or allocating the various logical entities for various tasks or users may categorically assign reliability values to each of the logical entities. In instances, the administrator may assign the values in the form of SLO inputs that in turn get stored as reliability values in the metadata of the logical entities. In instances, the administrator may review the type of logical entity being constructed and assign a reliability value according to the type of data associated with the logical entity. For example, the administrator may establish a volume 1204 for a new project for maintaining employee payroll records. Given the importance of the data to be stored in such a volume, the administrator may assign a "gold" reliability value for the volume, and such a reliability value gets attached to the metadata of volume 1204. In examples, the administrator may accomplish such reliability value assignment through a user interface of the storage system. Such an interface may be afforded, for example, by the M-Host 218 of the storage system.

In other embodiments, the reliability values may be automatically assigned to the volume based on the type of data being stored in a volume, as indicated in block 1236. Again, this may be accomplished in conjunction with storage SLOs or by means of inputs provided by a user. For example, the storage system, when establishing a logical entity (e.g., volume 1206), determines a type of data to be stored in the entity. The type of data may be determined, for example, based on information that may be supplied a request is received to create the entity. Based on the type of data, the system may look up information provided by storage SLOs or input provided by the user to determine a reliability value to be attached to the logical entity (e.g., volume 1206).

Using one of the above mechanisms, the reliability values are attached to the high-level logical entities. In the illustration in FIG. 12, volumes 1202 and 204 are assigned "gold" standard reliability values because they are respectively to be used to store data relating to a project workspace or the user's personal workspace. Volume 1206, designated as scratch space, is assigned a "bronze" standard reliability value. The eventual allocation of physical storage blocks is now based on the reliability values assigned to the logical entities. On a high-level, data from each logical entity is assigned to physical storage blocks selected from a particular parity group based on the reliability levels. For example, volumes 1202 and 1204, with their "gold" reliability values are assigned to storage blocks from a parity group with a high reliability coefficient. In one embodiment, the reliability coefficient is a function of the protection level afforded by the parity group. Accordingly, data corresponding to volumes 1202 ad 1204 are allocated to physical storage blocks selected from, for example, parity group 1 with double-parity (e.g., a RAID-DP parity group) or other such high protection characteristics. Volume 1206 may in turn be allocated to physical storage blocks from parity group 3 that has lower protection characteristics (e.g., a RAID 0 parity group).

In embodiments, the reliability value is propagated to the parity groups based on the data stored in physical storage blocks selected from the parity groups. To illustrate this, physical storage blocks that store data corresponding to the "gold" reliability value are selected from parity group 1 in the above example. Accordingly, a "gold" standard reliability value is attached to parity group 1. In one embodiment, such reliability value information may be attached to metadata associated with the parity group. In this manner, by virtue of reliability values propagated to the parity groups from the logical entity, reliability values are explicitly attached to the parity groups. In embodiments, the reliability values may also be attached to the individual storage devices (e.g., storage disks) that are inherent to each parity group.

An illustrative manner by which the reliability information may be propagated from the logical entity to the physical storage blocks is explained with reference to the exemplary architecture discussed above with reference to FIGS. 5-11. Reliability values are first assigned and attached to the individual volumes 58 in volume layer 51. In one embodiment, such reliability values are attached to metadata associated with the volumes 58. The volume layer 51, in addition to mapping the individual volumes 58 to individual regions 57 and placing logical extents 59 within each region 57, also translates the volume-level reliability values to corresponding regions 57 of the volumes 58. The reliability value of each region is basically the same as the volume that the region corresponds to. In embodiments, the reliability information is stored in metadata associated with each region and also attached to the logical extents defined by the regions. When the regions 57 apportion storage by acquiring slabs 56 from the aggregate layer 53, the system selects slabs 56 based on certain attributes related to the storage SLOs. For example, metadata associated with the slabs 56 specify attributes of the storage blocks specific to the slabs. The attributes may specify attributes such as, for example, device type (e.g., SSD, high-capacity SATA drive, etc.), I/O bandwidth specifications, protection level (RAID-0, RAID-1, RAID-DP, etc.), and other such parameters. The system described here focuses on the protection-level attribute to select a slab that has a protection level commensurate with the reliability level specified for a volume corresponding to the selected slab(s). For example, a slab with a "RAID-DP" protection-level attribute is selected for volume 1206 (which has a "gold" reliability value). In embodiments, the system may also take into account other attributes (e.g., disk type) in addition to the protection-level attribute in determining the selection of particular slabs.

The selection of the slabs (based at least on the protection-level attribute) effectively allows the system to select physical storage devices from a parity group that corresponds to the protection-level attribute of the selected slabs. For example, a slab with protection-level attribute "RAID-DP" comprises physical storage blocks that have a RAID-DP protection level. If, in some instances, a slab with a protection-level attribute "RAID-DP" and a disk-type attribute "SSD" is selected, such a slab would comprise physical storage blocks that satisfy both attributes. Accordingly, in this manner, the selection of the protection-level attribute dictates the selection of physical storage devices from a specific parity group. The system stores data corresponding to the logical entity (e.g., a volume from volume layer 51) in the physical storage blocks selected from a specific parity group (based, for example, on the SLO reliability value associated with the logical entity).

As indicated above, in addition to allocating parity groups based on the reliability value, the system also encodes (e.g., by incorporating as metadata information) the reliability value of a logical entity to both the parity group from which the physical storage blocks are selected, as well as to the physical storage units as well. In this manner, the reliability information is propagated and explicitly encoded at the lower levels (e.g., RAID layer level 54) of the storage system. Using this explicit reliability information, the lower levels of the storage system can efficiently optimize data operations such as, for example, integrity checking, backup, reconstruction schedules, etc.

Figure 13:
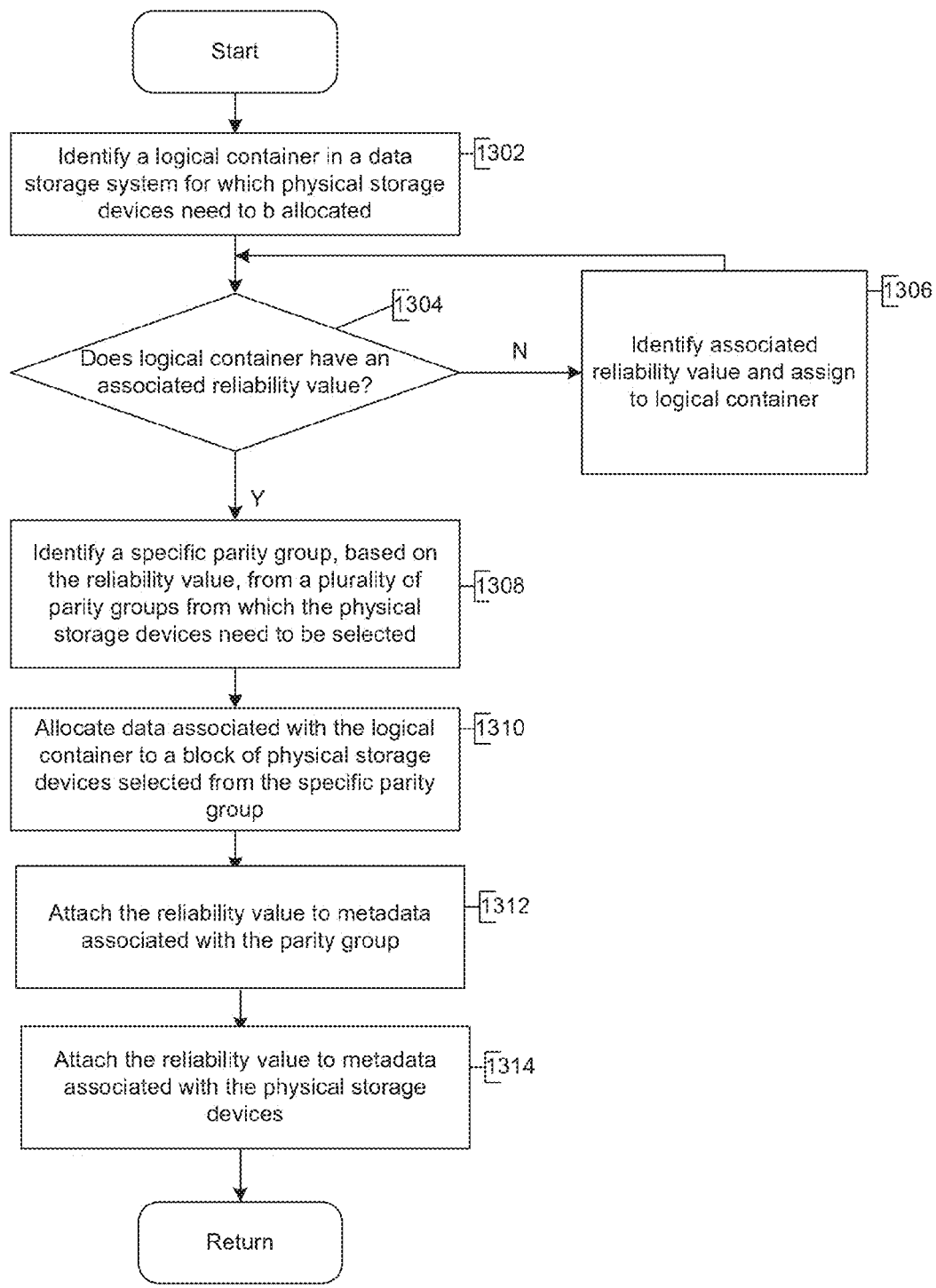
FIG. 13 describes a process for allocation of physical storage blocks based on reliability values associated with logical data entities.
Figure 14:
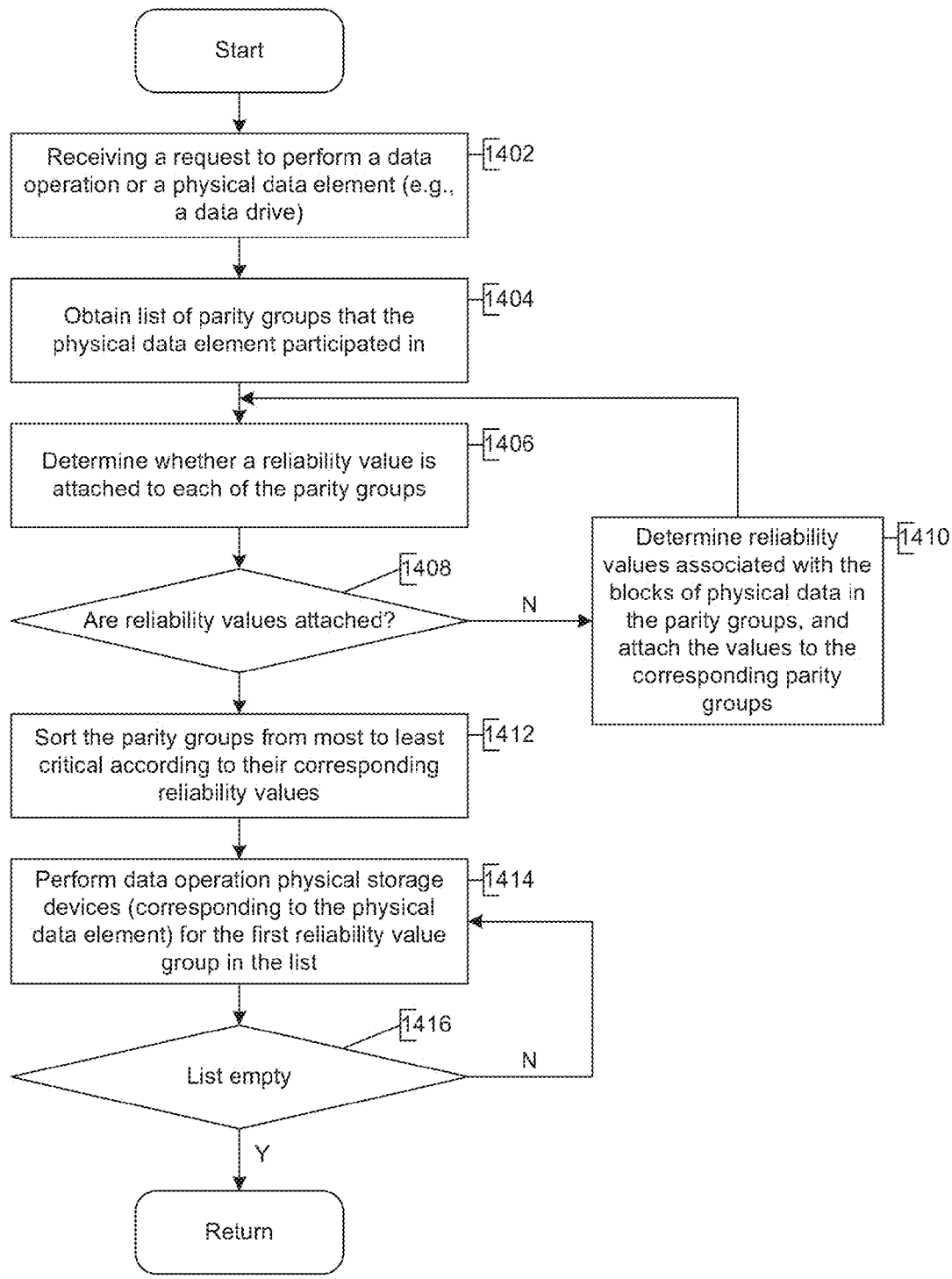
FIG. 14 illustrates an exemplary process by which the system performs prioritized data operations.

FIG. 13 now describes a process for allocation of physical storage blocks based on reliability values associated with logical data entities. The system initially identifies, at step 1302, a logical container (e.g., a volume) for which physical storage blocks need to be allocated. At step 1304, the system identifies whether the logical container already has an associated reliability value (e.g., based on a prior user setting, based on previously applied rules, etc.). For example, the system may query metadata associated with the logical container to determine whether a reliability value exists. If such a reliability value does not exist, the system identifies and assigns, at step 1306, a reliability value for the logical container. As discussed above, the system may identify the reliability value for the logical container based on reliability SLO objectives, or based on user input, or based on the type of data the container may already or be configured to store.

The process then returns to step 1308, where the system identifies a specific parity group (in the physical storage entity layer) from which physical storage blocks should be selected. In embodiments, the system selects such a parity group based on the reliability level associated with the logical entity. For example, a RAID-DP parity group is selected for a logical container with a "gold" reliability value, and a RAID 0 parity group is selected for a logical container with a "bronze" reliability value. Subsequent to selecting the specific parity group, the process continues to step 1310, where data corresponding to the logical container is allocated to physical storage blocks within the selected parity group. Further, at step 1312, the system attaches the reliability value to metadata associated with the parity group. Additionally, in some instances, the system also attaches the reliability value to the individual physical storage units that store the information associated with the logical entity.

As discussed above, allocation of the physical storage blocks in this manner has several benefits. For example, the system now has the capability to perform data operations (e.g., maintenance operations, backup operations, reconstruction operations, etc.) in a prioritized order based on the reliability values of the parity groups. FIG. 14 now illustrates an exemplary process by which the system performs such prioritized data operations. At step 1402, the system receives a request (e.g., as a user input, as a system initiated command, as an interrupt operation, as a failure recovery operation, etc.) to perform the data operation relating to physical storage units or even to an entire physical data element (e.g., a failed drive).

In response to receiving the request, the process proceeds to step 1404, where the system identifies a list of parity groups that the physical store units or the physical data element participated in. Subsequently, at step 1406, the system determines (e.g., by analyzing metadata associated with the parity groups) whether the parity groups have associated reliability value information. If such information is not available, as indicated in step 1408, the process shifts to step 1410, where the system identifies the reliability value associated with the parity groups by traversing the storage hierarchy. For example, the system may query metadata associated with slabs to which the parity groups are attached to determine the reliability value. If that is unsuccessful, the system traverses up the chain all the way, for example, to the volume layer to identify the reliability value associated with the logical entity. The system identifies the identified reliability value to the associated parity groups and the process then shifts to step 1412.

At step 1412, the list of parity groups is sorted to generate a prioritized/ordered list of parity groups. In an illustrative example, the ordered list first lists all the parity groups with "gold" reliability values, then lists the "silver" parity groups, and finally the "bronze" reliability values. Finally, at step 1414, the system performs the data operation on the physical storage units according to the prioritized list. For example, the data operation is first performed on physical storage units belonging to "gold" rated parity groups. The operation is then performed on the physical storage units belonging to the "silver" rated parity groups and so on. The data operation may also be staggered or selectively enabled based on user preferences to further increase efficiency of the data operations. For example, during recovery of a failed drive, the physical storage units corresponding to the "gold" parity groups are immediately reconstructed so as to avoid interruption of data access to information with high reliability requirements. However, the reconstruction of the physical storage units belonging to the "bronze" parity groups may be pushed out indefinitely or performed only during the system's idle cycles. In this manner, both reliability and efficiency objectives are met by ensuring that high-reliability data is prioritized for data operations, while potentially performance-intensive operations on a wide latitude of low-reliability data is pushed out to idle cycles.

The techniques introduced above can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A storage system node for use in a cluster of network storage nodes, the storage system node comprising:
   a first module configured to provide network communication services to communicate with a network storage host over a network, the first module further configured to communicate with a separate module in each network storage node in the cluster; and
   a second module operatively coupled to the first module and configured to provide storage and retrieval of data objects in a nonvolatile mass storage facility that includes multiple physical storage devices, the second module configured to:
   assign one of multiple reliability values to each of multiple parity groups of physical storage devices, wherein a specific reliability value assigned to a given parity group is based on a corresponding reliability value associated with at least one block of physical storage devices comprised in the given parity group;
   receive a request to perform an operation on at least one of overall physical storage devices associated with the multiple parity groups of physical storage devices; and
   perform the operation on each of the at least one physical storage device according to a prioritized order, the prioritized order determined based on the reliability values assigned to the parity groups associated with the at least one physical storage device.

2. A storage system node as recited in claim 1, wherein the operation is performed first on at least one physical storage device belonging to a parity group with a highest reliability value.

3. A storage system node as recited in claim 1, wherein each of the at least one block of physical storage devices pertains to a particular logical container of data, and wherein the reliability value associated with each of the at least one block of physical storage devices is based on a logical-container reliability value associated with a corresponding logical container of data.

4. A storage system node as recited in claim 3, the module further configured to: assign a particular logical-container reliability value to each logical container of data based on a service level objective (SLO) associated with the storage system node.

5. A storage system node as recited in claim 3, the second module further configured to: assign a particular logical-container reliability value to a given logical container of data based on a type of data associated with the given logical container of data.

6. A storage system node as recited in claim 3, the second module further configured to: assign a particular logical-container reliability value to a given logical container of data based on an input provided by a user through a management console of the storage system node.

7. A storage system node as recited in claim 3, wherein the operation is at least one of: a consistency check relating to the at least one physical storage device; or a post-failure reconstruction of he at least one physical storage device.

8. A storage system node for use in a cluster of network storage nodes, the storage system node comprising:
   a first module configured to provide network communication services to communicate with a network storage host over a network, the first module further configured to communicate with a separate module in each network storage node in the cluster; and
   a second module operatively coupled to the first module and configured to provide storage and retrieval of data objects in a nonvolatile mass storage facility that includes multiple physical storage devices associated with multiple logical containers of data, each of the multiple physical storage devices having multiple parity groups, the second module configured to:
   assign a logical-container reliability value to each of the multiple logical containers of data;
   for each of the multiple logical containers of data:
   allocate a block of a particular parity group of physical storage devices to store data, the particular parity group selected for allocation based on a corresponding logical-container reliability value associated with each of the multiple logical containers of data; and
   assign a parity-group reliability value to the particular parity group selected, the parity-group reliability value based on the corresponding logical-container reliability value.

9. A storage system node as recited in claim 1, wherein the logical-container reliability value is based on a service level objective (SLO) associated with the storage system node.

10. A storage system node as recited in claim 1, wherein the logical-container reliability value is based on a type of data associated with each corresponding logical container of data.

11. A storage system node as recited in claim 1, wherein the logical-container reliability value is based on an input provided by a user through a management console of the storage system node.

12. A storage system node as recited in claim 1, wherein the second module is further configured to: for each of the multiple logical containers of data, store the parity-group reliability value in a metadata container associated with the particular parity group.

13. A storage system node as recited in claim 1, wherein the second module is further configured to receive a request to perform an operation on at least one of the multiple physical storage devices; and perform the operation on the at least one physical storage device according to a prioritized order, the prioritized order determined based on parity-group reliability values assigned to corresponding parity groups associated with the at least one physical storage device.

14. A storage system node as recited in claim 13, wherein the operation is at least one of: a consistency check relating to the at least one physical storage device; or a post-failure reconstruction of the at least one physical storage device.

15. A computer readable storage medium storing computer-executable instructions, comprising:
  instructions for assigning, in a data storage system having multiple physical storage devices to store data, one of multiple reliability values to each of multiple parity groups of physical storage devices, wherein a specific reliability value assigned to a given parity group is based on a corresponding reliability value associated with one or more blocks of physical storage devices comprised in the given parity group;
  instructions for receiving a request to perform an operation on at least one of the multiple physical storage devices of the data storage system; and
  instructions for performing the operation on each of said at least one physical storage device according to a prioritized order, the prioritized order determined based on the reliability values assigned to the parity groups associated with said at least one physical storage device.

16. A computer readable storage medium as recited in claim 15, wherein the operation is performed first on one or more physical storage devices belonging to a parity group with a highest reliability value.

17. A computer readable storage medium as recited in claim 15, wherein each of the one or more blocks of physical storage devices pertains to a particular logical container of data, and wherein the reliability value associated with each of the one or more blocks of physical storage devices is based on a logical-container reliability value associated with a corresponding logical container of data.

18. A computer readable storage medium as recited in claim 17, further comprising: instructions for assigning a particular logical-container reliability value to each logical container of data based on a service level objective (SLO) associated with the data storage system.

19. A computer readable storage medium as recited in claim 17, further comprising: instructions for assigning a particular logical-container reliability value to a given logical container of data based on a type of data associated with the given logical container of data.

20. A computer readable storage medium as recited in claim 15, wherein the operation is at least one of: a consistency check relating to the at least one physical storage device; or a post-failure reconstruction of the at least one physical storage device.

\* \* \* \* \*